United States Patent [19]
Kawatsuki et al.

[11] Patent Number: 5,155,622
[45] Date of Patent: Oct. 13, 1992

[54] POLARIZING OPTICAL ELEMENT AND DEVICE USING THE SAME

[75] Inventors: Nobuhiro Kawatsuki; Masao Uetsuki, both of Kurashiki, Japan

[73] Assignee: Kuraray Co., Ltd., Kurashiki, Japan

[21] Appl. No.: 742,479

[22] Filed: Aug. 5, 1991

Related U.S. Application Data

[63] Continuation of Ser. No. 286,720, Dec. 20, 1988, abandoned.

[30] Foreign Application Priority Data

| Dec. 24, 1987 | [JP] | Japan | 62-328753 |
| Mar. 23, 1988 | [JP] | Japan | 63-70517 |
| Apr. 18, 1988 | [JP] | Japan | 63-96511 |
| Apr. 18, 1988 | [JP] | Japan | 63-96512 |
| Jun. 17, 1988 | [JP] | Japan | 63-150438 |

[51] Int. Cl.⁵ .......................... G02B 5/18; G02B 5/30
[52] U.S. Cl. ........................ 359/485; 359/566; 359/569; 369/109; 369/110
[58] Field of Search ............ 350/162.2, 370, 162.11, 350/162.17, 162.23, 394, 395; 369/109, 110; 359/485, 566, 569

[56] References Cited

U.S. PATENT DOCUMENTS

| 1,717,360 | 6/1929 | Anderson, Jr. et al. | 350/395 |
| 3,622,220 | 11/1971 | Kogelnik | 350/3.61 |
| 4,448,485 | 5/1984 | Bergman et al. | 350/162.2 |
| 4,800,547 | 1/1989 | Kessels et al. | 369/109 |
| 4,846,552 | 7/1989 | Veldkamp et al. | 350/162.2 |
| 4,856,857 | 8/1989 | Takeuchi et al. | 350/3.61 |
| 4,885,734 | 12/1989 | Yuzo | 350/162.2 |

FOREIGN PATENT DOCUMENTS

| 2535072 | 4/1984 | France | 350/162.23 |
| 59-86010 | 5/1984 | Japan | 350/162.2 |

OTHER PUBLICATIONS

Herwig Kogelnik, "Coupled Wave Theory for Thick Hologram Gratings", *The Bell System Technical Journal*, vol. 48, No. 9, Nov. 1969, pp. 2909 to 2947.

Cowan et al., "Artificial Polarization Anomalies from Holographic Gratings", *Optics Communications*, vol. 21, No. 3, Jun. 1977, pp. 428-431.

Moharam et al., "Diffraction Characteristics of Photoresist Surface-Relief Gratings", *Applied Optics*, vol. 23, No. 18, Sep. 15, 1984, pp. 3214-3220.

*Primary Examiner*—Bruce Y. Arnold
*Assistant Examiner*—Martin Lerner
*Attorney, Agent, or Firm*—Oblon, Spivak, McClelland, Maier & Neustadt

[57] ABSTRACT

A polarizing optical element which comprises a first substrate having a first surface formed with first and second gratings so as to cross relative to each other at a predetermined crossing angle, each of which first and second gratings has a grating pitch equal to or smaller than the wavelength of a laser beam which may be incident upon the polarizing optical element. A magneto-optical head system of a type comprising a laser source for emitting and projecting a laser beam on a magneto-optical recording medium and utilizing a magneto-optical effect for reading information, recorded on the magneto-optical recording medium, by the utilization of reflected or transmitted laser beams reflected from or transmitted through the magneto-optical recording medium and utilizing the polarized optical element is also disclosed.

13 Claims, 23 Drawing Sheets

Fig. 11

Intensity and Change in Intensity of Diffracted Beam

Unit (‰)

| Angle θ | Intensity of Beam L2 | Change in L2 | Intensity of Beam L3 | Change in L3 | Change in Difference in Intensity |
|---|---|---|---|---|---|
| 0° | 21 | | 21 | | |
| 10° | 14 | −7 | 27 | +6 | −13 |
| 20° | 7 | −7 | 35 | +8 | −15 |
| 30° | 2 | −5 | 42 | +7 | −12 |
| 40° | 1 | −1 | 48 | +6 | −7 |
| 50° | 3 | +2 | 50 | +2 | 0 |
| 60° | 7 | +4 | 50 | 0 | +4 |
| 70° | 14 | +7 | 47 | −3 | +10 |
| 80° | 23 | +9 | 41 | −6 | +15 |
| 90° | 33 | +10 | 33 | −8 | +18 |
| 100° | 42 | +9 | 23 | −10 | +19 |
| 110° | 49 | +7 | 15 | −8 | +15 |
| 120° | 50 | +1 | 7 | −8 | +9 |
| 130° | 52 | +2 | 4 | −3 | +5 |
| 140° | 52 | 0 | 2 | −2 | +2 |
| 150° | 50 | −2 | 4 | +2 | −4 |
| 160° | 38 | −12 | 7 | +3 | −15 |
| 170° | 30 | −8 | 13 | +6 | −14 |
| 180° | 21 | −9 | 21 | +8 | −17 |

$\beta = 90° - \frac{T}{2}$

A = 35°
T = 120°

POLARIZING OPTICAL ELEMENT AND DEVICE USING THE SAME

This application is a Continuation of application Ser. No. 07/286,720, filed on Dec. 20/88, now abandoned.

BACKGROUND OF THE INVENTION

1. Field of the Invention

The present invention relates to a magneto-optical head utilizing the magneto-optical effect to read information from a magneto-optical disc and a polarizing optical element used in the magneto-optical head. The present invention also relates to a polarizing analyzing device for detecting diffracted light from the polarizing optical element.

2. Description of the Prior Art

As a writable and erasable information carrier, a magneto-optical medium is well known in the market. In recording or erasing information on or from the medium, respectively, the magneto-optical medium exhibits such a characteristics that, when a laser beam is radiated to the disc accompanied by an increase in temperature thereof, the coercive force of the disc is lowered. On the other hand, when reading the recorded information from the mangeto-optical medium, Kerr effect or Faraday effect is utilized. In other words, by utilization of a phenomenon in which, when the laser beam is reflected from or transmitted through the magnetized magneto-optical medium, polarizing plane rotates, information recorded on the magneto-optical medium is read out therefrom by the detection of a slight change in polarizing state of the laser beam. One example of the magneto-optical head assembly used for the information reading by the utilization of Kerr effect or Faraday effect is illustrated in FIG. 1 of the accompanying drawings.

Referring to FIG. 1, reference numeral 1 represents a semiconductor laser source for emitting a laser beam L which is projected onto a magneto-optical medium 6 after having been collimated by a collimator lens 2 and after having subsequently been passed through a beam shaping prism 3, then through a first beam splitter 4 and finally through an objective lens 5. Reference numeral 21 represents a second beam splitter; reference numeral 22 represents a polarizing beam splitter; reference numerals 26 and 27 represent respective first and second photodetectors each comprised of a photodiode; reference numeral 28 represents a four-division photo-detector assembly comprised of four photodiodes; reference numeral 31 represents an error detector for detecting a focusing error and a tracking error; and reference numeral 32 represents a differential detector.

The illustrated magneto-optical head assembly of the construction shown in FIG. 1 operates in the following manner. The laser beam L emitted from the semiconductor laser source 1 is, after having been collimated by the collimator lens 2, passed through the beam shaping prism 3. The beam shaping prism 3 is operable to render the cross-section of the collimated laser beam L to represent a circular cross-sectional shape. The laser beam having passed through the beam shaping prism 3 is, after having passed through the first beam splitter 4, condensed by the objective lens 5 and then projected onto magneto-optical medium 6. The laser beam L so projected onto the magneto-optical medium 6 is reflected back towards the first beam splitter 4 through the objective lens 5.

When information is being written on the magneto-optical medium 6, the laser beam has its polarizing plane rotated under the influence of Kerr effect and subsequently enters the first beam splitter 4 after having passed through the objective lens 5. The reflected laser beam entering the first beam splitter 4 is deflected by the first beam splitter 4 so as to travel along a path different from the path through which the incoming laser beam has passed through the first beam splitter 4. The laser beam deflected by the first beam splitter 4 is indicated by L1 and travels towards the second beam splitter 21. The reflected laser beam L1 entering the second beam splitter 21 is in part deflected so as to travel towards the photo-detecor assembly 28 and in part passed therethrough towards the polarizing beam splitter 22.

The reflected laser beam traveling from the second beam splitter 21 towards the photo-detector assembly 28 as indicated by L6 is detected by the photo-detector assembly 28, an electric output from which assembly 28 is supplied to the error detector 31 for the detection of the focusing error and/or the tracking error. Should one or both of the focusing and tracking errors occur, the error detector 31 provides an output signal to a servo system (not shown) well known to those skilled in the art which is designed to eliminated to focusing error and/or the tracking error. On the other hand, the reflected laser beam having passed through the second beam splitter 21 and traveling towards the polarizing beam splitter 22 as indicated by L7 is in part passed therethrough towards the photo-detector 26 as indicated by L8 and in part deflected by the polarizing beam splitter 22 so as to travel towards the photo-detector 27 as indicated by L9. The intensity of each of the laser beams L8 and L9 incident upon the photo-detectors 26 and 27, respectively, varies with a change in polarizing state of the reflected laser beam L1 and, therefore, information read out from the magneto-optical medium 6 can be picked up by detecting the difference between the outputs from the photo-detectors 26 and 27 with the use of the differential detector 32 to which they are supplied.

However, in the prior art magneto-optical head assembly, since one and the same reflected laser beam L6 is used for the detection of the focusing error and that of the tracking error, a cross-talks tends to occur between these two detection systems, posing a problem in that one or both of the focusing and the tracking tends to become insecure.

In order to eliminate the above discussed problem, the magneto-optical head system wherein the reflected laser beam L6 is further divided into two components for use in the detection of the focusing error and that of the trcking error has been proposed, such as shown in FIG. 2 and FIG. 3.

According to the system shown in FIG. 2, a third beam splitter 23 is disposed on the path of travel of light from the second beam splitter 21 towards the photo-detector 29. This third beam splitter 23 is utilized to divide the laser beam L6 into two light components L10 and L11; one component traveling towards and detected by a third photo-detector 29 and the other component traveling towards and detected by a fourth photo-detector 40. An output from the photo-detector 29 is supplied to a focusing error detector 34 whereas an output from the photo-detector 30 is supplied to a trcking error detector 33. In this circuit construction, since the separate detectors 34 and 33 are used for the detection of the focusing error and the tracking error, respectively, no problem associated with the signal cross-talk occur.

In the system shown in FIG. 3, arrangement has been made that the laser beam reflected from the magneto-optical medium 6 is allowed to be in part deflected by the first beam splitter 4 so as to travel towards the polarizing beam splitter 22 and in part passed therethrough towards a fourth beam splitter 24 disposed on the path between the first beam splitter 4 and the beam shaping prism 3 so that the reflected laser beam entering the fourth beam splitter 24 can be deflected, as the laser beam L12, towards the third beam splitter 23. In this arrangement, while the laser beam L1 deflected by the first beam splitter 4 is utilized for the information processing in a manner similar to that described with reference to FIG. 1, the laser beam L12 deflected by the fourth beam splitter 24 is divided into the beam components L10 and L11 by the third beam splitter 23 in a manner similar to that described with reference to FIG. 2 for the detection by the photo-detectors 29 and 30, respectively. Even in the system of FIG. 3, the separate detectors 34 and 33 are used for the detection of the focusing error and the tracking error, respectively, no problem associated with the signal cross-talk occur.

A further approach to eliminate the problem associated with the cross-talk is illustrated in FIG. 4. According to the system shown in FIG. 4, arrangement has been made that the reflected laser beam L1 entering the polarizing beam splitter 22 is divided by such polarizing beam splitter 22 into the light components L8 and L9 which are respectively detected by the photo-detectors 30 and 29 which are connected with the tracking error detector 33 and the focusing error detector 34. Respective outputs from the tracking and focusing error detectors 33 and 34 are supplied to a comparator 32 operable to provide an output signal indicative of the difference in intensity between the light components L8 and L9 for reading information recorded on the magneto-optical medium 6.

In any one of the prior art magneto-optical head systems shown in and described with reference to FIGS. 1 to 4, respectively, since the detection of the focusing condition and the tracking condition requires the use of a plurality of beam splitters 21 to 24 for dividing the reflected laser beam L1 into a corresponding number of light components, not only does the magneto-optical head assembly tend to become bulky, but also the use of the expensive optical elements makes the manufacture costly.

In particular, in the system shown in and described with reference to FIG. 1, since one and the same beam is used for the detection of the focusing error and that of the tracking error, the problem associated with the cross-talk occurs. Although any one of the systems shown in FIGS. 2 and 3, respectively, is effective to eliminate this problem, the extra beam splitter is required in the system of any one of FIGS. 2 and 3 as compared with the system shown in FIG. 1, making the system as a whole bulky and expensive.

On the other hand, in the system of FIG. 4, although the magneto-optical head assembly can be made compact as compared with that shown in and described with reference to any one of FIGS. 2 and 3, it has been experienced that, since the intensity of the laser beam L8 which has been passed through the polarizing beam splitter 22 and the intensity of the laser beam L9 which has been deflected by the polarizing beam splitter 22 tend to vary in correspondence with the change in level of the signal recorded on the magneto-optical medium 6, the intensity of the beam used for the detection of the focusing error and that for the detection of the tracking error vary correspondingly to such an extent as to result in the unstable signal processing performed by the focusing and tracking error detectors 34 and 33.

Apart from the above, it is well known that the diffraction grating having a grating pitch not greater than the wavelength of light exhibits a diffraction efficiency dependent on the polarization of the incident light, such as discussed by Mohara, et al., Appl. Optics, Vol. 23, No. 18, p. 3214, 15th Sep. 1984. A series of experiments conducted with the use of the diffraction grating wherein the grating pitch $\Lambda$ is 0.5 micrometers have shown that, as shown in FIG. 5, when the wavelength $\lambda$ of the light incident upon such diffraction grating is 780 nm, S polarized light and P polarized light have given respective diffraction efficiencies which are considerably different from each other.

In view of the foregoing, the substitution of the diffraction grating for the polarizing beam splitter 22 employed in the system of FIG. 1 for separating the reflected laser beam L1 deflected from the first beam splitter 4 would eliminate the use of the expensive optical element. However, the mere replacement of the polarizing beam splitter with the diffraction grating tends to increase the bulkiness of the magneto-optical head assembly as a whole with no number of necessary component parts minimized.

The above discussed problem may be found in other applications than the magneto-optical head assembly. In other words, considering a problem inherent the polarizing optical element itself operable to reflect a portion of the laser light and to transmit therethrough the remaining portion of the same laser light, only one reflected light and only one transmitted light are available therefrom and, therefore, the systems will require the use of an increased number of polarizing optical elements if a large amount of information is desired to be handled. On the other hand, considering a problem inherent in the polarization analyzing device in which the differential detector is provided for detecting the difference in intensity between light components separated by the polarizing optical element, the system will require the use of an increased number of polarizing optical elements if a large amount of information is desired to be handled.

SUMMARY OF THE INVENTION

Accordingly, the present invention has been devised with a view to substantially eliminating the above discussed problems inherent in the prior art systems and has for its object to provide an improved polarizing optical element effective to handle an increased amount of information.

Another important object of the present invention is to provide an improved polarization analyzing devise inexpensive to make and utilizing the polarizing optical element of the type referred to above.

Further important object of the present invention is to provide an improved magneto-optical head assembly which employs a minimized number of component parts and is compact in size.

According to one aspect of the present invention, there is provided a polarizing optical element which comprises a first substrate having a first surface formed with first and second gratings so as to cross relative to each other at a predetermined crossing angle, each of said first and second gratings having a grating pitch equal to or smaller than the wavelength of a laser beam which may be incident upon the polarizing optical element.

Preferably, the polarizing optical element may have a generally plate-like semitransparent reflective layer.

Preferably, the polarizing optical element may have a semitransparent reflective layer overlaying the first and second gratings and a second substrate having a smooth surface and an indented surface opposite to each other, said second substrate being laminated over the first and second gratings with the indented surface held in contact therewith. In this case, the indented surface of the second substrate should be in complemental relationship in shape to the first and second gratings so that, when the semitransparent reflective layer is overlaid over the first and second gratings, no interstices or voids will be formed between the first and second gratings and the indented surface of the second substrate.

Again preferably, the polarizing optical element may further comprise a light reflective layer. This light reflective layer is formed over the first and second gratings.

According to another aspect of the present invention, there is provided a polarization analyzing device which comprises the polarizing optical element, a first error detector responsive to the transmitted laser beam from the polarizing optical element for detecting one of focusing and tracking conditions, a second error detector responsive to the reflected laser beam from the polarizing optical element for detecting the other of the focusing and tracking conditions; and a differential detector operable to detect the difference between the two transmitted and diffracted laser beams thereby to read the information from the magneto-optical recording medium.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

FIG. 11 is a table showing results of experiments conducted to measure respective intensities of diffracted laser beams relative to the angle of the polarizing plane of the incoming laser beam;

DETAILED DESCRIPTION OF THE EMBODIMENTS

Figure 1:
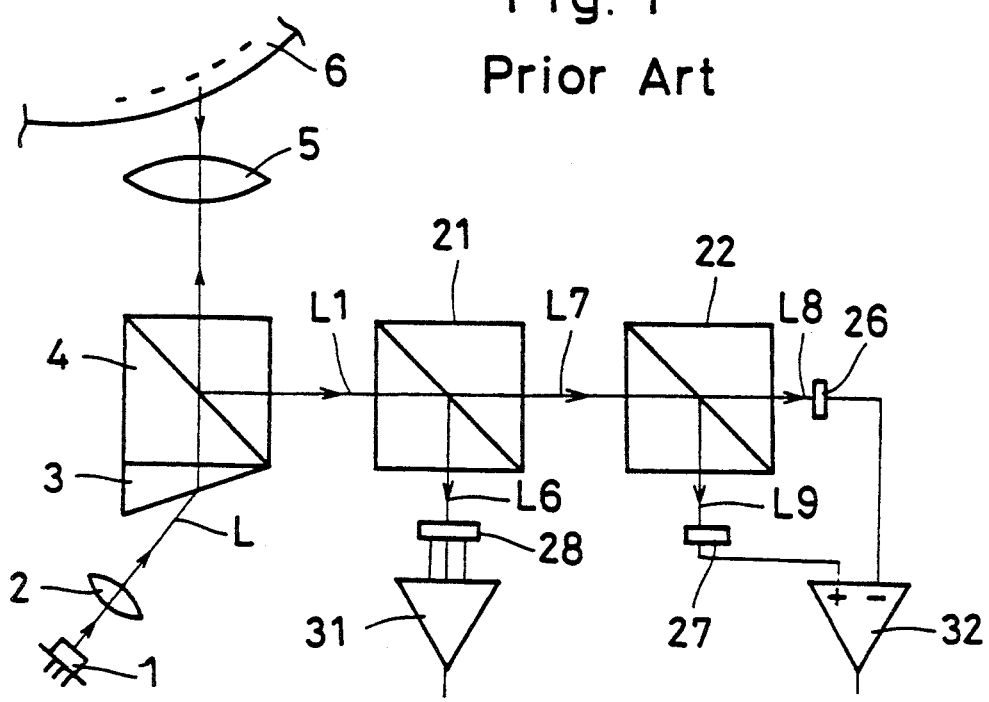
FIGS. 1 to 4 are schematic diagrams showing the prior art magneto-optical head systems.
Figure 2:
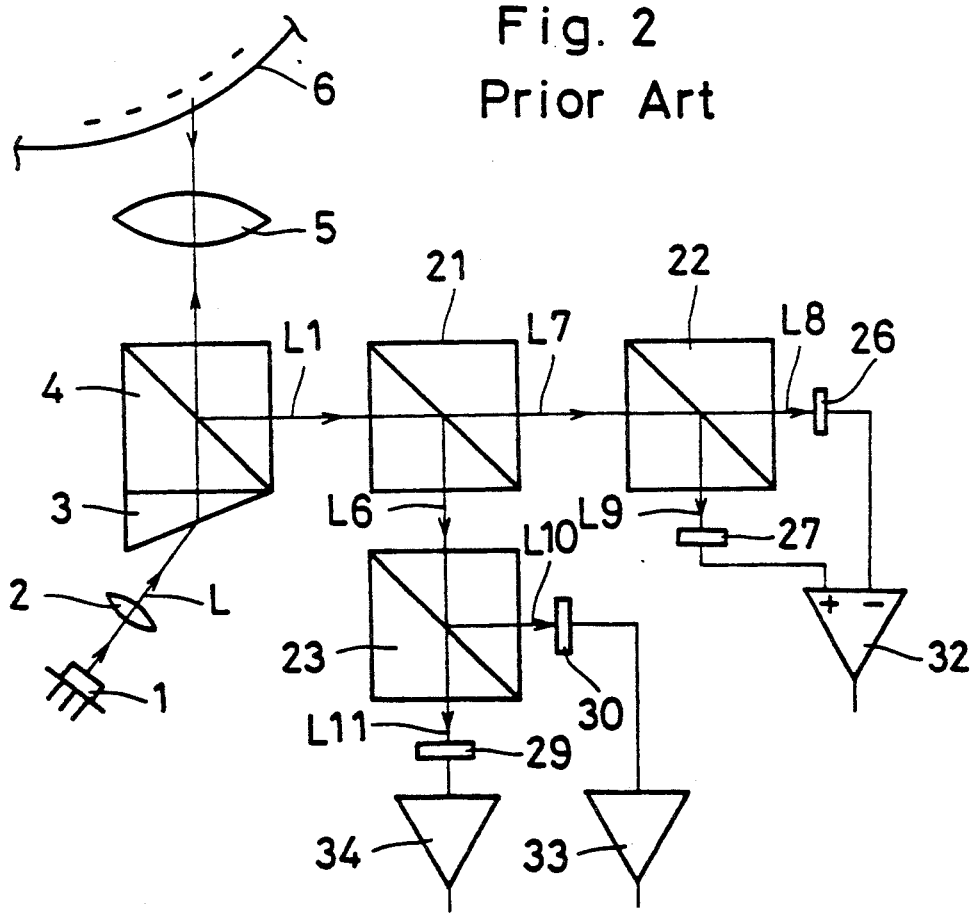
Figure 3:
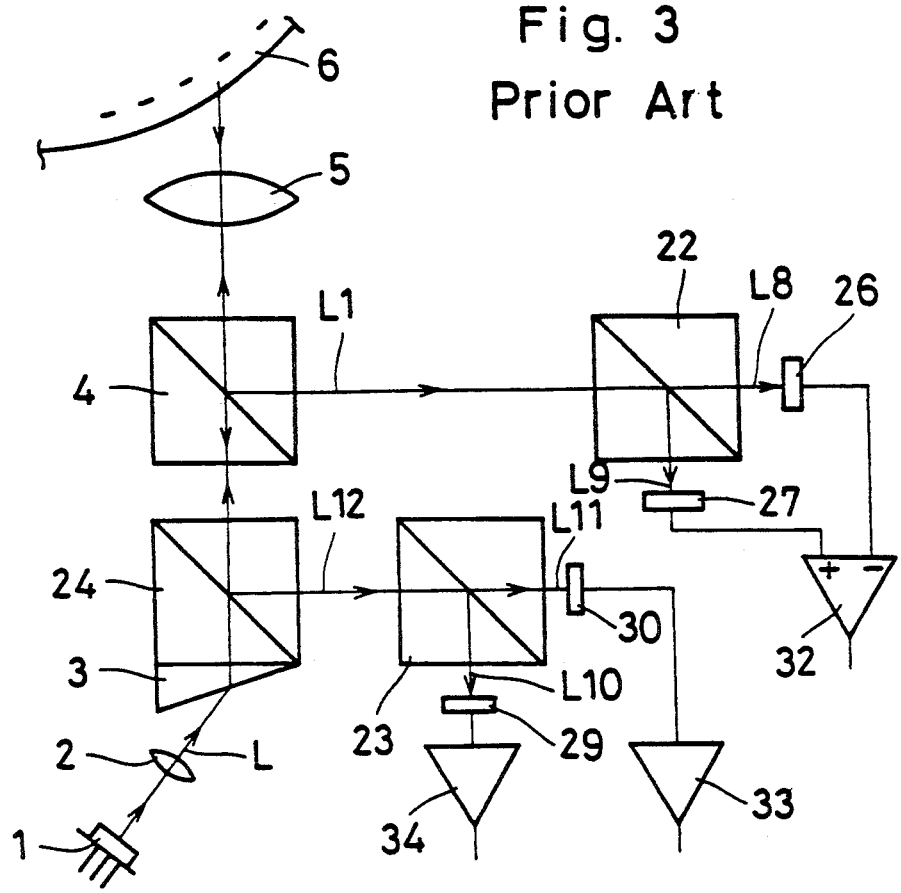
Figure 4:
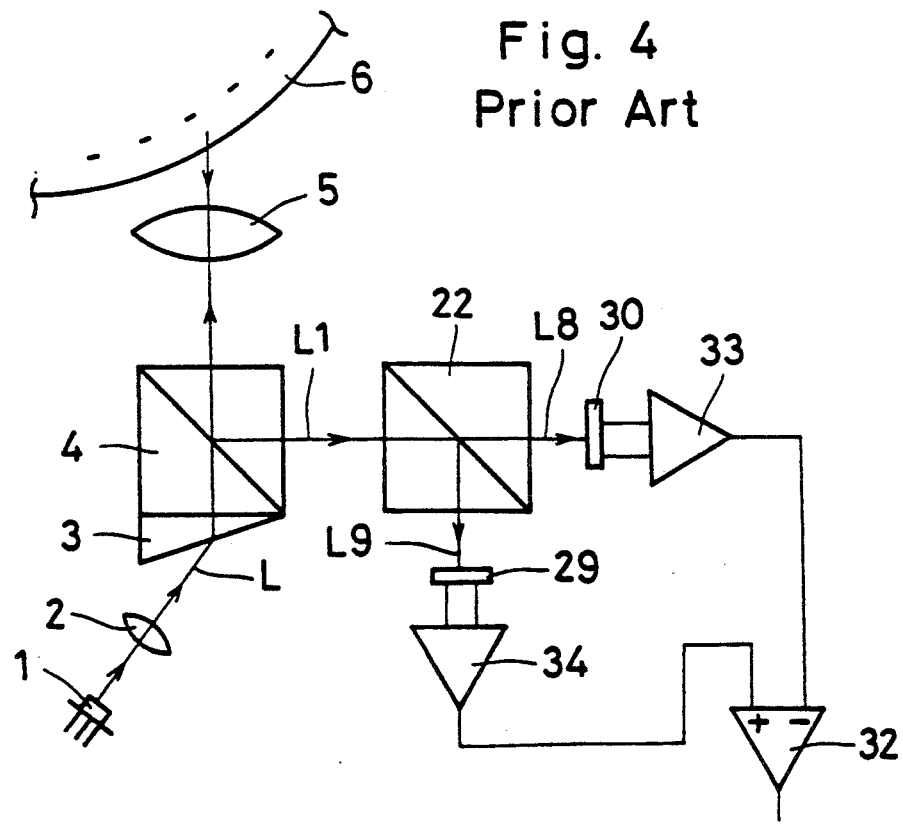
Figure 5:
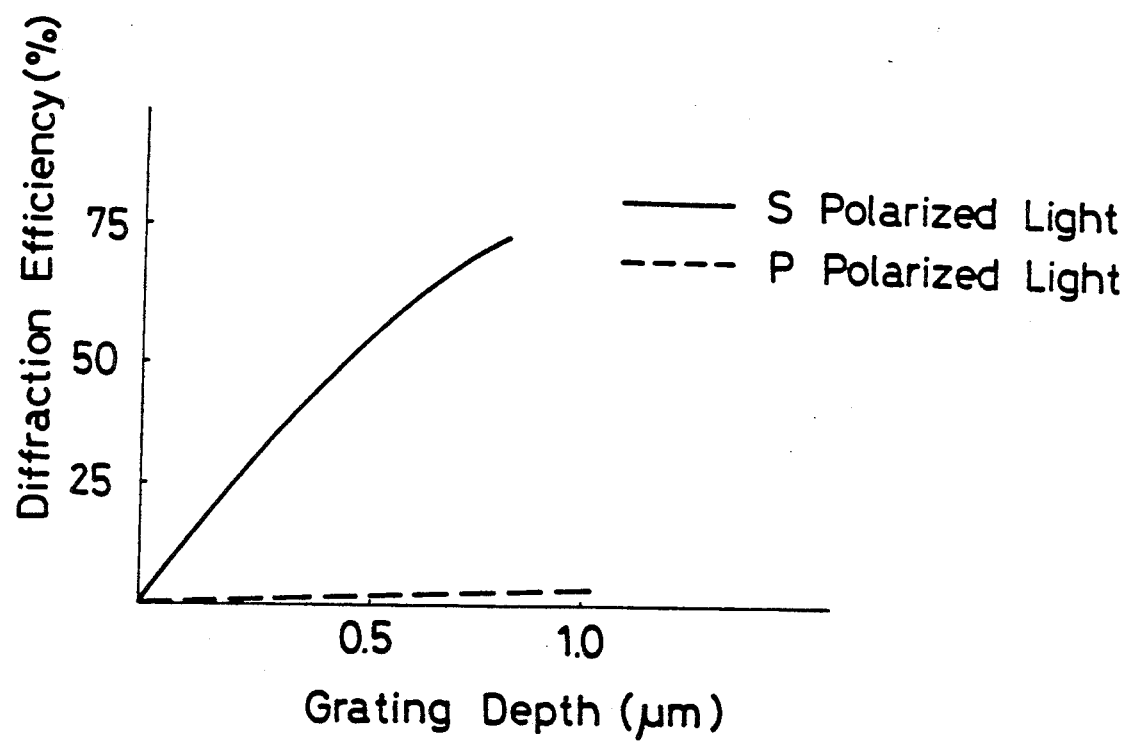
FIG. 5 is a graph showing characteristic curves illustrating respective diffraction efficiencies of the S polarized light and the P polarized light.
Figure 6:
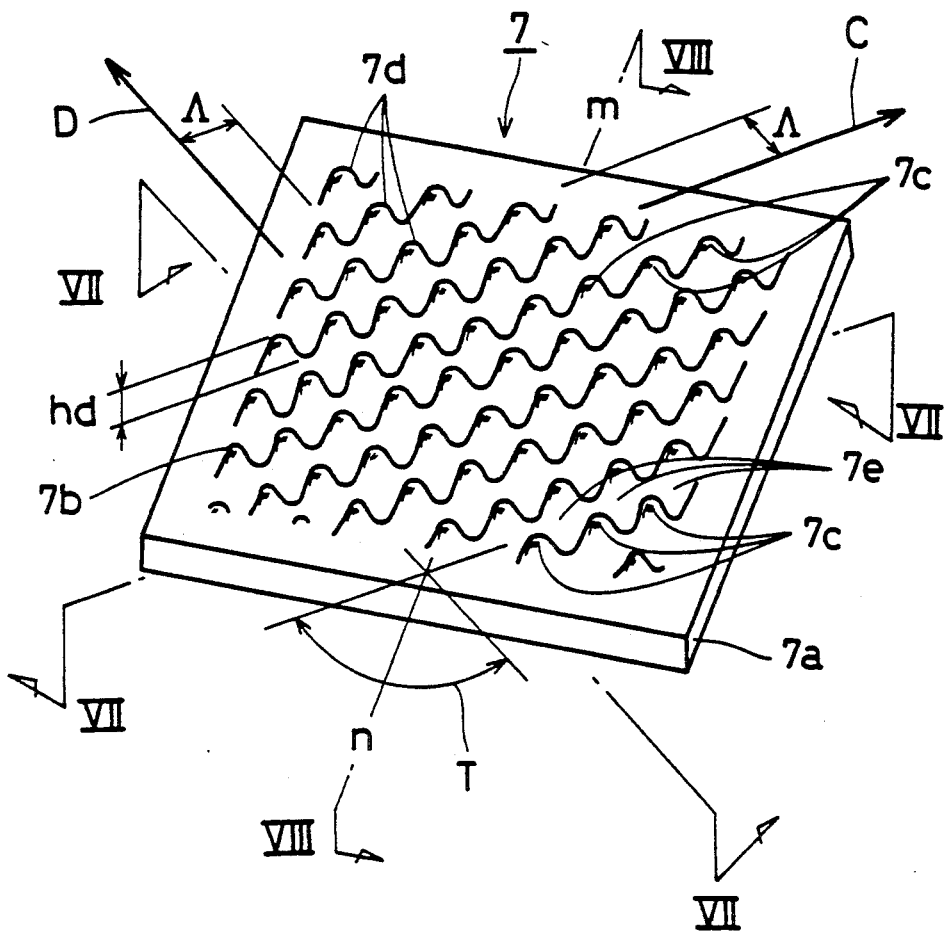
FIG. 6 is an exaggerated perspective view of a polarizing optical element according to a first preferred embodiment of the present invention.
Figure 7:
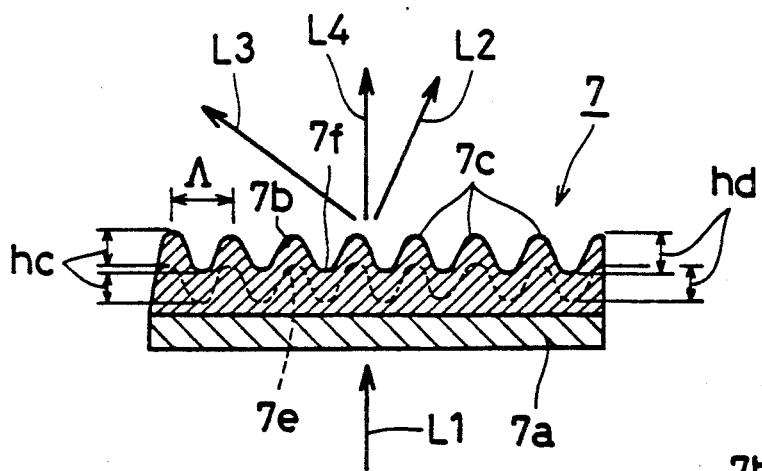
FIG. 7 is a cross-sectional view taken along the line VII—VII shown in FIG. 6.

Referring first to FIGS. 6 and 7 illustrating a first preferred embodiment of the present invention, there is shown a transparent three-division element (polarizing optical element) 7. This three-division element comprises, as best shown in FIG. 7, a generally rectangular substrate 7a having one surface formed with a multiple of minute projections 7b which are patterned to provide first and second cross gratings 7c and 7d. Each neighboring minute projections 7b are spaced a predetermined pitch, for example, 0.52 micrometer, which is smaller than the wavelength, for example, 830 nm, of a laser beam incident thereupon in respective directions shown by the arrows C and D.

Figure 8:
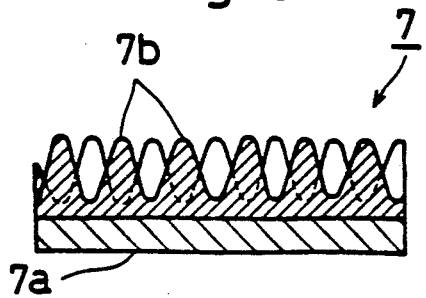
FIG. 8 is a cross-sectional view taken along the line VIII—VIII shown in FIG. 6.

The first grating 7c has a predetermined grating height hc as measured from grooves 7e shown by the phantom lines in FIG. 7 and is operable to emit diffracted light L2. On the other hand, the second grating 7d has a grating height hd as measured from grooves 7f and is operable to emit transmitted and diffracted light L3. It is to be noted that, although in FIG. 6 a grating appears to exist in a direction shown by the line m-n, the cross-sectional representation of the three-division element 7 taken along the line m-n indicates, as shown in FIG. 8 which illustrates the cross-section of the three-division element 7 taken along the line VIII—VIII in FIG. 6, there is no grating height and, therefore, no grating exists. Where the grating heights hc and hd shown in FIG. 8 are chosen to be equal to each other, the respective diffraction efficiencies of the first and second gratings 7c and 7d become equal to each other.

Figure 9:
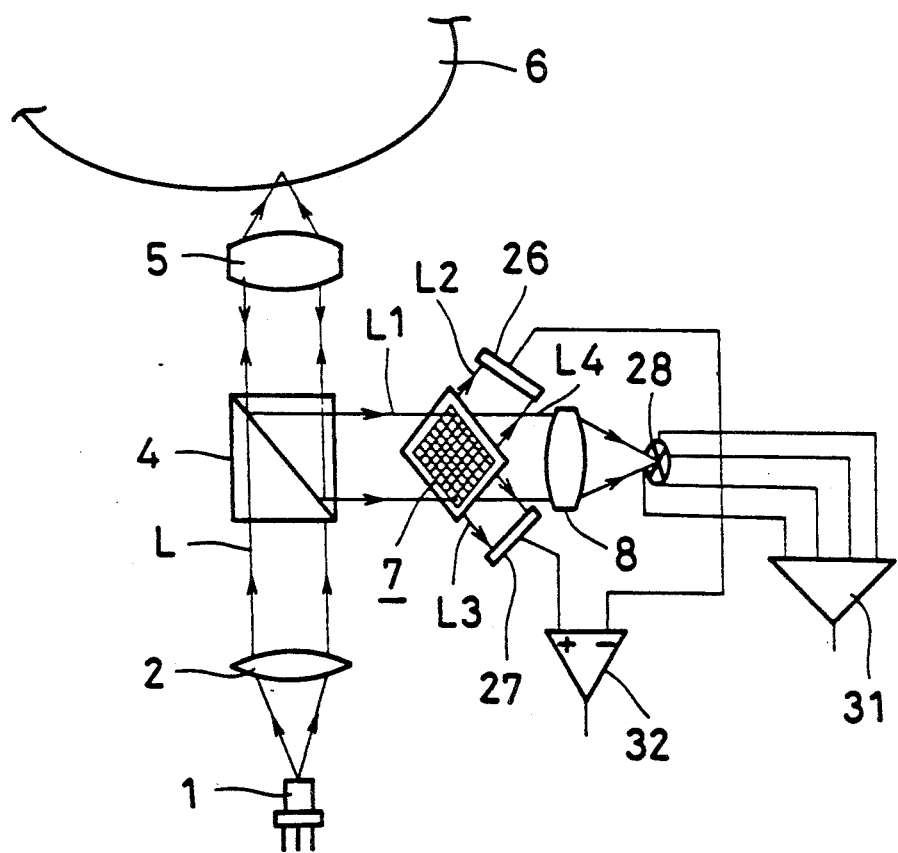
FIG. 9 is a schematic diagram showing a magneto-optical head system utilizing the polarizing optical element shown in FIG. 6.

A magneto-optical head assembly utilizing the three-division element 7 of the construction shown in and described with reference to FIGS. 6 and 7 is shown in FIG. 9. Referring to FIG. 9, the three-division element 7 is disposed between the beam splitter 4 and the four-division photo-detector assembly 28 together with a sensor lens 8 positioned between the three-division element 7 and the photo-detector assembly 28. This three-division element 7 is so positioned at a predetermined angle of orientation, as will be described with reference to FIG. 10, as to permit the first and second gratings 7c and 5d to face towards the sensor lens 8.

Figure 10:
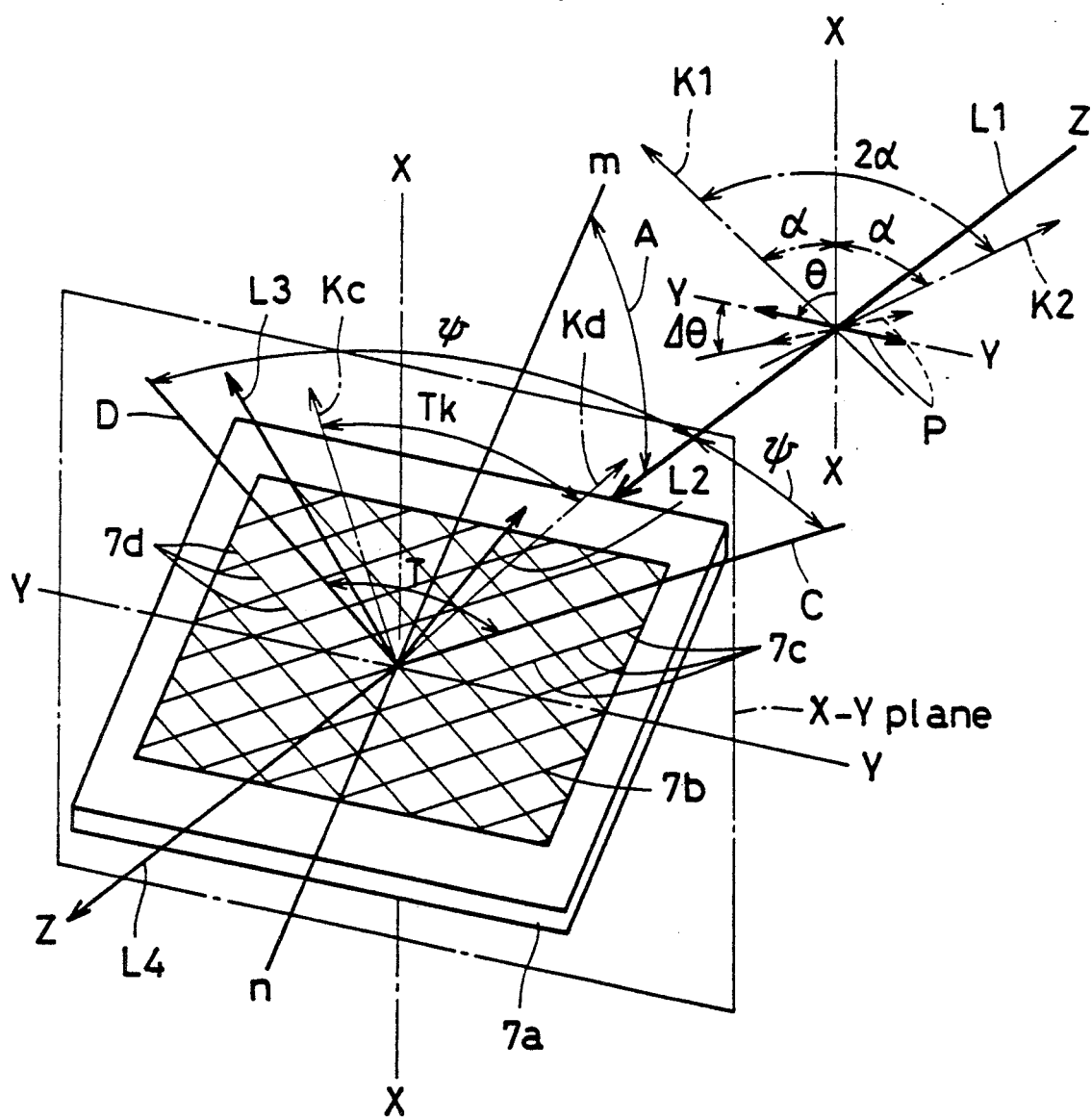
FIG. 10 is a schematic perspective view showing the angles of orientation of the polarizing optical element according to the first preferred embodiment of the present invention.

Referring to FIG. 10, assuming that the direction of travel of the reflected laser beam L1 from the beam splitter 4 towards the three-division element 7 is expressed by a Z-axis, then, X- and Y-axes which are perpendicular to each other lie in a plane perpendicular to the Z-axis. Reference character C represents a line of direction connecting the tops of each row of the projections 7b of the first grating 7c (FIG. 6) together and reference character D represents a line of direction connecting the tops of each row of the projections 7b of the second grating 7d (FIG. 6) together. A symbol $\psi$ represents a stereo angle between the Z-axis and each of the lines C and D of direction of the first and second gratings 7c and 7d. The inclination of the three-division element 7 relative to the Z-axis is so selected as to render the stereo angle $\psi$ between the Z-axis and the line C to be equal to the stereo angle $\psi$ between the Z-axis and the line D. Reference character T represents the angle between the lines C and D of direction of the first and second gratings 7c and 7d, that is, the angle of crossing between the first and second gratings 7c and 7d on the surface of the three-division element 7. The line m-n represents a center line of the three-division element 7 which divides the crossing angle T into two equal parts on the surface of the three-division element 7. A symbol A represents the angle formed between the Z-axis and the line m-n. The axis which is formed by projecting the center line m-n on the plane containing the X- and Y-axes coincides with the X-axis whereas the Y-axis is perpendicular to the X-axis. Reference characters Kc and Kd represent K vectors defined on the surface of the substrate 7a in directions perpendicular to the lines C and D of direction of the first and second gratings 7c and 7d, respectively. Reference character Tk represents the K vector angle formed between these K vectors Kc and Kd. Reference character $2\alpha$ represents the angle of projection of the K vector angle Tk on the plane containing the X- and Y-axes. Reference characters K1 and K2 represents projected K vectors formed by projecting the K vectors Kc and Kd onto the plane containing the X- and Y-axes, respectively.

In the illustrated embodiment, the projection angle $2\alpha$ is chosen to be 90°. In other words, the angle $2\alpha$ of projection of the angle Tk, formed between the K vectors Kc and Kd perpendicular to the first and second gratings 7c and 7d on the three-division element 7, respectively, onto the plane containing the X- and Y-axes is chosen to be 90°.

The angle $\theta$ represents the angle formed between the X-axis and a polarizing plane P of the incident laser beam L1 and is, in the illustrated embodiment, chosen to be 90°. Accordingly, the polarizing plane P lies on the Y-axis which is rotated 90° from the X-axis dividing the projection angle 2α into two equal parts, and inclined 45° relative to each other of projected K vectors K1 and K2.

Before the description of the operation of the three-division element 7 according to the first embodiment of the present invention proceeds, the operating characteristics thereof will first be discussed.

Assuming that the angle $\theta$ of the polarizing plane P of the incident laser beam L1 is 0°, the polarizing plane P forms an angle α relative to each of the projected K vectors K1 and K2 and, therefore, the incident laser beam L1 is symmetrical with respect to the K vectors K1 and K2, rendering the intensities of the transmitted and diffracted beams L2 and L3 to be equal to each other. When the angle $\theta$ of the polarizing plane P is increased from 0° towards 180°, the angle between the polarizing plane P and each of the K vectors K1 and K2 varies with concomitant change in intensity of the diffracted beams L2 and L3. The table shown in FIG. 11 illustrates an experimentally measured change in intensity of each of the transmitted and diffracted beams L2 and L3 with change in angle $\theta$.

During the experiment which led to the result shown in the table of FIG. 11, the laser beam having the wavelength λ of 830 nm was employed and the three-division element 7 used was of a type having 0.52 micrometers in grating pitch Λ, 0.6 micrometer in both of the grating height hc and hd, 35° in angle A, 124° in crossing angle T and 90° in projection angle 2α. The angle $\theta$ of the polarizing plane P was adjusted from 0° to 180° for the purpose of measurement of the transmitted and diffracted beams L2 and L3. The results shown in the table of FIG. 11 is plotted in the graph of FIG. 12.

Figure 12:
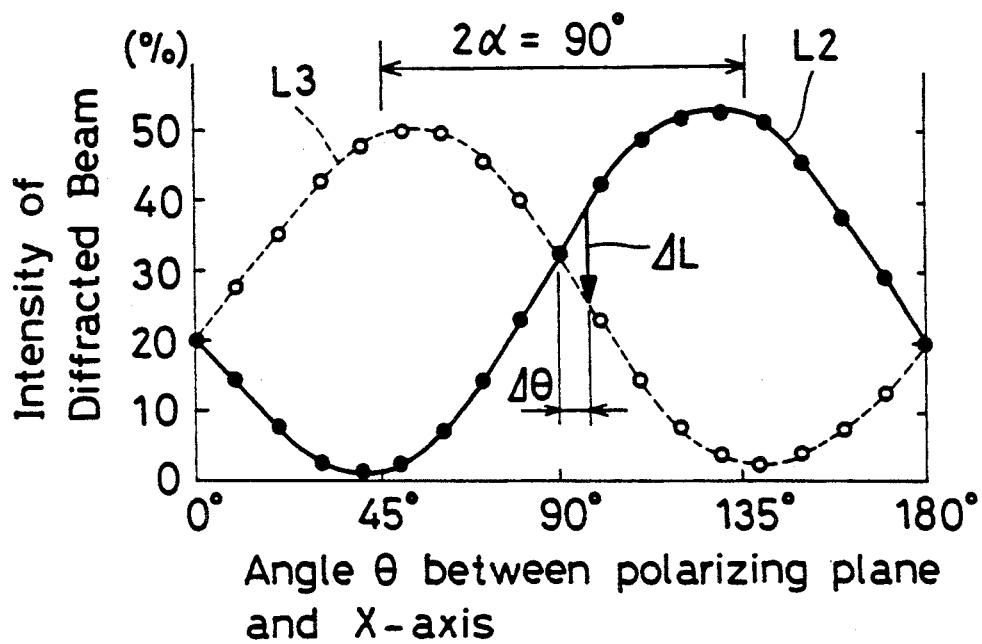
FIG. 12 is a graph showing characteristic curves illustrating change in respective intensities of the diffracted laser beams when the projection angle 2α is selected to be 90° in the system of FIG. 9.

According to the characteristic curves shown in the graph of FIG. 12, it seems that the angles each formed between the polarizing plane P and the projected k vector K1 are equal to each other when the angle $\theta$ of the polarizing plane P is 0° and 90°, respectively, and therefore, the respective intensities of the transmitted and diffracted beams L2 and L3 become equal to each other. However, the both have actually exhibited a slightly different value probably because of the difference in reflectance attributable to the substrate 7a and the influence brought about by the surface indentations (See FIG. 8) along the m-n line.

The operation will now be described.

Referring back to FIG. 9, the laser beam L emitted from the diode laser 1 is, after having passed through the collimator lens 2, the beam splitter 4 and the objective lens 5, projected onto the magneto-optical recording medium 6 and is then reflected towards the beam splitter 4. The reflected laser beam L entering the beam splitter 4 is deflected towards the three-division element 7 as indicated by L1 whereat the laser beam L1 is divided into three beams, namely, two transmitted and diffracted beams L2 and L3 and a transmitted beam L4. Where a portion of the magneto-optical disc 6 at which the incoming laser beam L has been reflected towards the beam splitter 4 is not magnetized, the reflected laser beam L1 enters the three-division element 7 with its polarizing plane P held at the angle $\theta$ of 90° relative to the X-axis. In such case, since the respective angles between the projected k vectors K1 and K2 of the associated gratings 7c and 7d and the polarizing plane P of the laser beam L1 incident upon the three-division element 7 are [90°−α(45°)], the respective intensities of the transmitted and diffracted beams L2 and L3 are equal to each other as shown in FIG. 12.

On the other hand, where that portion of the magneto-optical disc 6 at which the incoming laser beam L has been reflected is magnetized, the polarizing plane P of the reflected laser beam is rotated a slight angle $\Delta\theta$ by Kerr effect and the reflected laser beam L1 enters the three-division element 7 with the angle between the polarizing plane P of the incident laser beam L1 and one of the projected k vectors K1 and K2 increasing and with the angle between the polarizing plane P of the incident laser beam L1 and the other of the projected k vectors K1 and K2 decreasing. In such case, since the respective angles between the polarizing plane P and the projected K vectors K1 and K2 of the gratings 7c and 7d are different from each other, a difference ΔL (See FIG. 12.) occur between the respective intensities of the diffracted beams L2 and L3. Accordingly, if the difference between the respective outputs from the photo-detectors 26 and 27 with the use of the differential detector 32, information recorded on the magneto-optical recording medium 6 can be read out.

The transmitted beam L4 referred to above and having passed through the three-division element 7 is converged by the sensor lens 8 onto the four-division photo-detector assembly 28 so that the tracking and focusing conditions can be detected by the tracking and focusing detector 31 in a manner well known to those skilled in the art.

According to the illustrated embodiment, since the single three-division element 7 is effective to divide the incident beams L1 into three beam components, the three-division element 7 plays a role which has hitherto been performed by the two beam splitters in the prior art. Therefore, the polarizing optical element according to the present invention is effective to provide a great deal of information at less expenses and, moreover, the use of the three-division element 7 contributes to the reduction in size and cost of the polarization analyzing device comprising the three-division element 7, the photo-detectors 26 and 27 and the differential detector 32 and also the magneto-optical head system utilizing this polarization analyzing device.

It is to be noted that, in the illustrated embodiment, the projection angle 2α shown in FIG. 10 has been described as set to 90°, it may be chosen to any value within the range of 0° to 180°. However, the projection angle 2α reflects a phase of each of the transmitted and diffracted beams L2 and L3 as shown in FIG. 12. Therefore, when the projection angle 2α is chosen to be 90°, the respective intensities of the transmitted and diffracted beams L2 and L3 vary in opposite directions with respect to each other within the range of 0° to 180° of the angle $\theta$ of the polarizing plane P and, therefore, regardless of what value the angle $\theta$ of the polarizing plane P may take as shown in FIG. 10, the rotation of the polarizing plane P can be detected.

Figure 13:
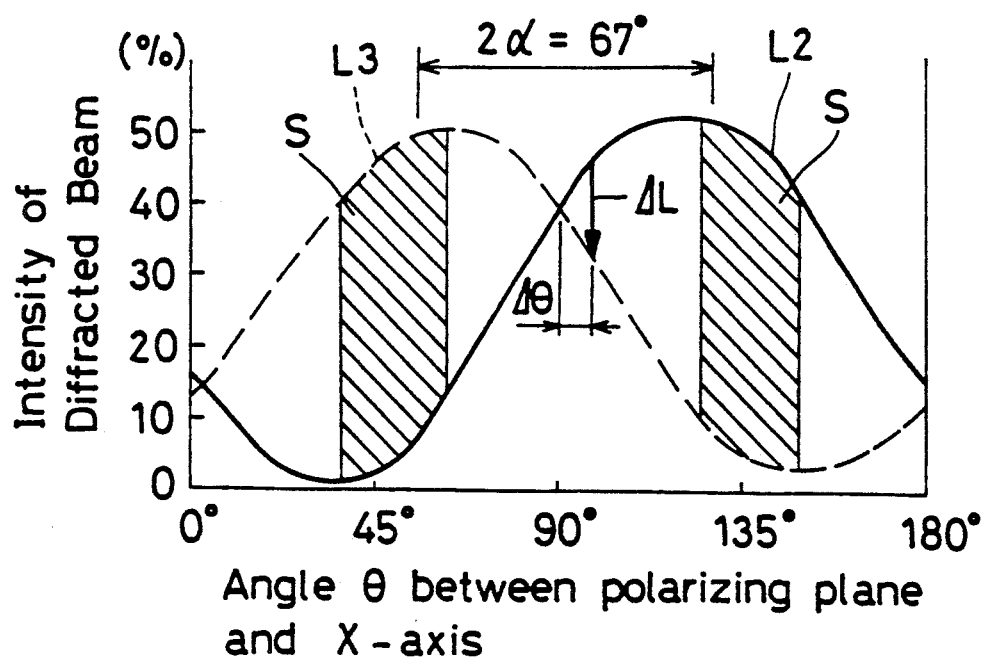
FIG. 13 is a graph similar to FIG. 12, showing characteristic curves illustrating change in the respective intensities of the diffracted laser beams when the projection angle 2α is selected to be 67°.

By way of example, where the projection angle 2α is chosen to 67°, the transmitted and diffracted beams L2 and L3 exhibit such respective characteristics as shown in FIG. 13, and, at hatched areas S in the graph of FIG. 13, no change occur in the difference ΔL in intensity between the transmitted and diffracted beams L2 and L3, and the intensity difference ΔL become smaller than that given when the projection angle 2α is chosen to 90° as shown in FIG. 12. Because of this, it is preferred that the projection angle 2α be within the range of 70° to 110° and, more preferably, within the range of 84° to 96°.

Where the projection angle 2α is chosen to be within the range of 84° to 96° and the respective grating heights hc and hd of the gratings 7c and 7d are chosen to be equal to each other, that is, where the respective diffraction efficiencies of the gratings 7c and 7d are chosen to be equal to each other, the intensity of the transmitted and diffracted beam L2 increases (or decreases) accompanied by a corresponding decrease (or increase) by an equal amount of the transmitted and diffracted beam L3 as shown in FIG. 12, resulting in a minimized change in transmitted beam L4. Accordingly, if arrangement is made that the intensity of the incident beam L1 itself can be changed according to certain information, information can be read out from the change in intensity of the transmitted beam L4.

On the other hand, where the projection angle 2α is chosen to be within the range of 10° to 20°, the two gratings 7c and 7d will become generally parallel to each other with the consequence that the change in difference ΔL of the respective intensities between the transmitted and diffracted beams L2 and L3 will become small, however, the directions in which the diffracted beams L2 and L3 are emitted, respectively, approach to each other. In other words, the angle formed between the transmitted and diffracted beams L2 and L3 will become small. Accordingly, the polarization analyzing device and the magneto-optical head system can be manufactured compact.

As can be understood from FIG. 12 and the table of FIG. 11, the difference ΔL between the respective intensities of the transmitted and diffracted beams L2 and L3 varies considerably when the polarizing plane P of the incident beam L1 assumes an angle θ of about 0°, 90° or 180°. This phenomenon also occurs even when the projection angle 2α is 67° or in other cases. Accordingly, the position of the polarizing plane P of the incident beam L1 is preferred to be inclined at an angle of ±5° relative to the X-axis or Y-axis. In other words, it is preferred that the position of the polarizing plane P lies at an angle of inclination within the range of +5° to −5° relative to the X-axis which divides the projection angle 2α into two equal parts or the Y-axis rotated 90° relative to the X-axis. In particular, where the angle θ is so selected that the intensity difference ΔL can take a value of different sign (positive or negative) corresponding to the increase and decrease of the angle θ, for example, when the angle θ=86° or θ+Δθ=94°, the rotation of the polarizing plane P of the incident beam L1 can be detected merely by detecting the sign of the intensity difference ΔL.

In the foregoing embodiment, although the angle ψ formed between the first grating 7c (C line) and the Z-axis has been shown as being equal to the angle formed between the second grating 7d (D line) and the Z-axis, the both may differ from each other.

A method of making the three-division element 7 of the construction shown in and described with reference to FIG. 6 will now be described.

In the first place, the grating pitch Λ, the grating height hd (or hc) and the crossing angle T of the three-division element 7 have to be determined. The crossing angle T is determined by the angles A and ψ of arrangement used in the magneto-optical head assembly utilizing the three-division element 7 and by the projection angle 2α. Accordingly, the relationship between these angles A, ψ and 2α and the crossing angle T has to be determined.

Figure 14:
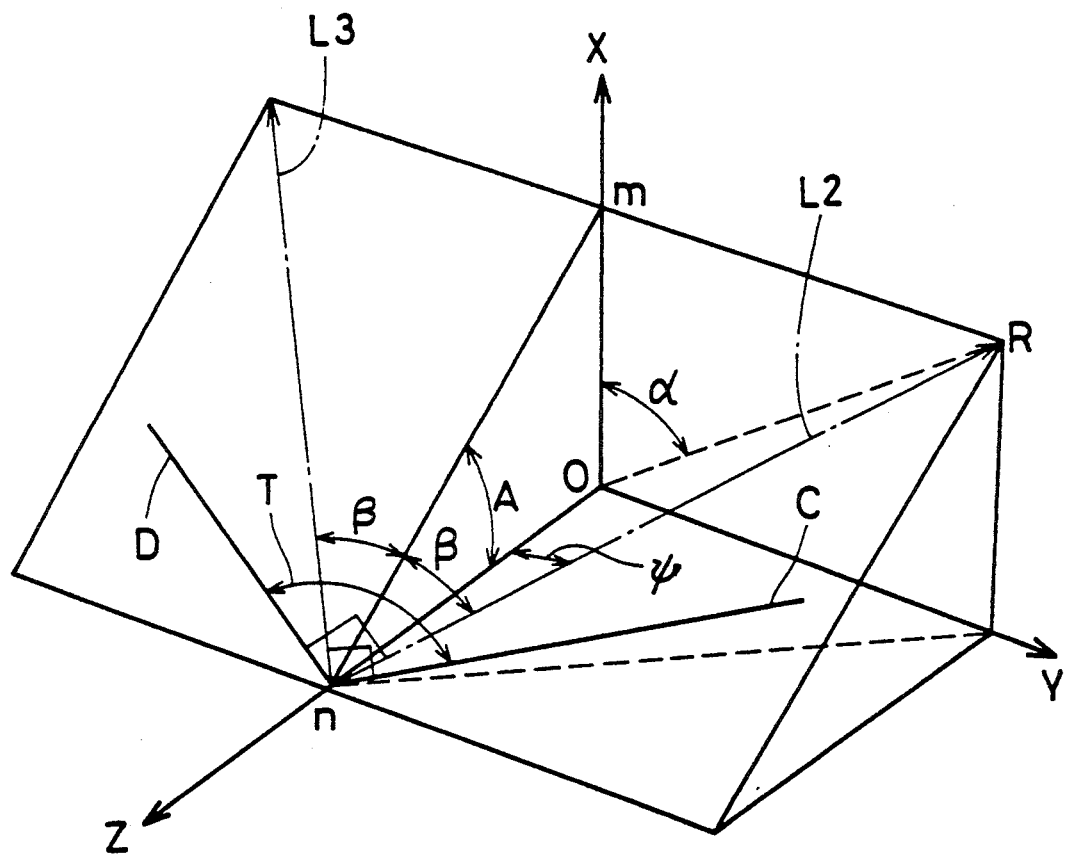
FIG. 14 is a schematic perspective view showing the relationship between the angle A of orientation of the polarizing optical element according to the first preferred embodiment of the present invention and the crossing angle T between two gratings formed therein.

Referring to FIG. 14, $$\frac{\tan A}{\tan \psi} = \frac{Om/On}{OR/On} = \frac{Om}{OR} = \cos \alpha \quad (1)$$

and $$\cos \beta \times \cos A = \frac{mn}{Rn} \times \frac{On}{mn} = \frac{On}{Rn} = \cos \psi$$

wherein $\beta = 90° - T/2$.
Therefore, $$\sin T/2 \times \cos A = \cos \psi \quad (2)$$

The crossing angle T can be calculated from the equations (1) and (2) above.

Figure 15A:
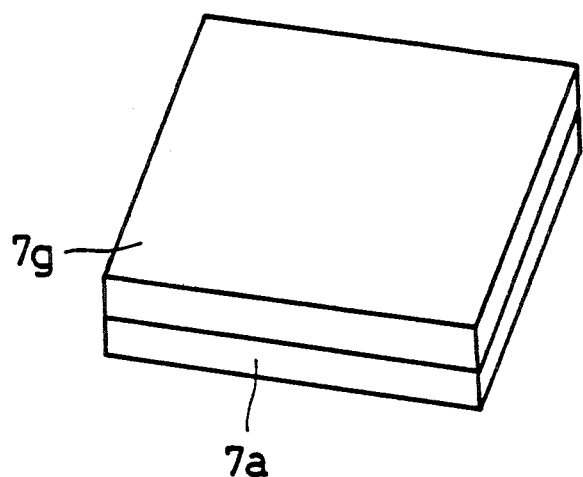
FIGS. 15(a) to 15(c) are schematic diagrams, respectively, illustrating the sequence of manufacture of the polarizing optical element according to the first preferred embodiment of the present invention.
Figure 15B:
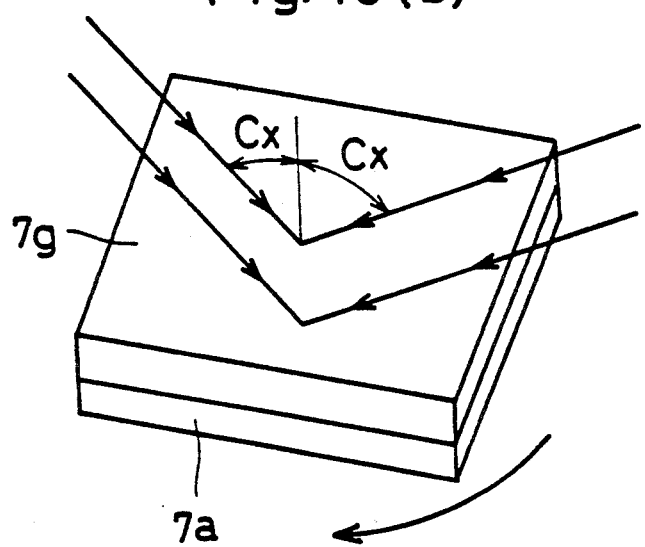
Figure 15C:
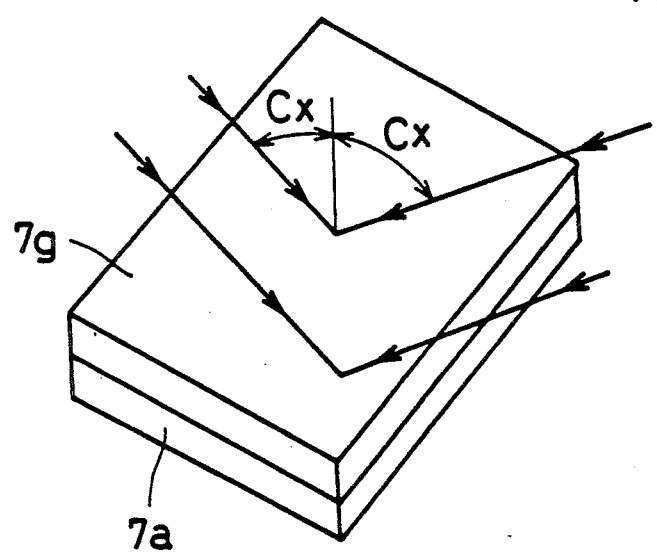

Then, as shown in FIG. 15(a), after a photo-resist of 2.0 micrometers in thickness has been formed by the use of a spin coating technique on a surface of the substrate 7a made of BK-7 glass, the substrate 7a having the photo-resist is pre-baked to complete a photo-resist layer 7g. Subsequently, as shown in FIG. 15(b), argon laser beams are radiated from two directions onto the photo-resist layer 7g at a predetermined angle Cx of incidence to effect a first interference exposure. After the first interference exposure, and after the substrate 7a having the photo-resist layer 7g has been rotated an angle equal to the crossing angle T (shown in FIG. 6), a second interference exposure is effected in a manner similar to the first interference exposure as shown in FIG. 15(c). Thereafter, the substrate 7a with the photo-resist layer 7g thereon is developed in a developing solution and then flushed with pure water to complete the three-division element 7 as shown in FIG. 6.

In the foregoing example of the method of making the three-division element 7, the interference exposures have been utilized along with the use of the photo-resist layer, a light sensitive polymer compound such as a photo polymer may be employed for the photo-resist layer and, as an exposure method, an electron scribing technique with the use of an electron beam or a direct scribing technique with the use of a laser beam may be employed for scribing each grating line.

The three-division element 7 manufactured in the manner as hereinabove described may be employed as a matrix for the manufacture of a nickel stamper by the use of an electroforming technique so that the nickel stamper can be used for the mass-production of the replicas of the three-division element 7 by the use of any suitable duplicating method such as, for example, an injection molding method, a compression molding method or a photo polymer method (2P method).

Figure 16:
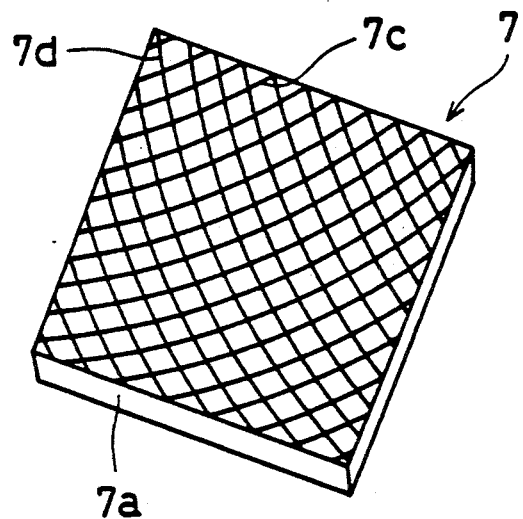
FIG. 16 is a schematic perspective view showing a modification of the polarizing optical element wherein the first and second gratings are curved.
Figure 17:
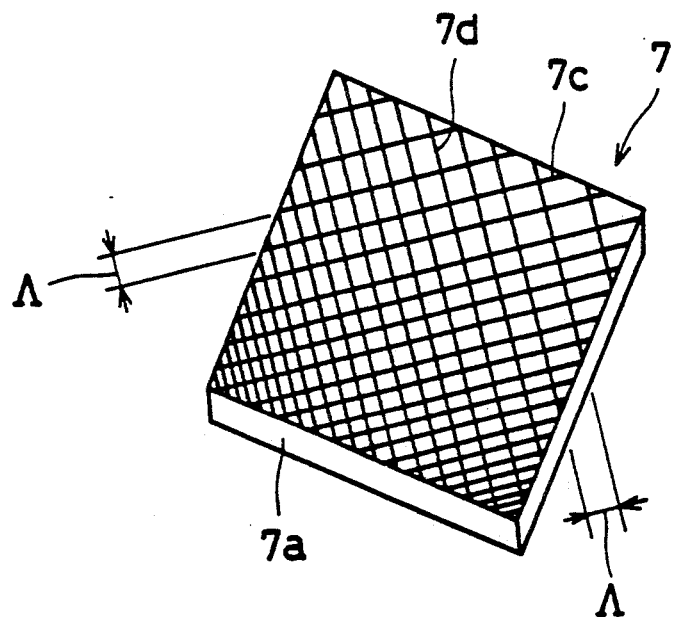
FIG. 17 is a schematic perspective view showing another modification of the polarizing optical element wherein each of the first and second gratings has a progressively varying grating pitch.

In the practice of the interference exposure technique, although the grating pitch Λ shown in FIG. 6 is determined by the angle Cx, the grating pitch Λ of the first grating 7c and the grating pitch Λ of the second grating 7d may be different from each other and, in such case, it can be accomplished if the different angles Cx shown in FIG. 15(b) and FIG. 15(c) are employed. Also, the first and second gratings 7c and 7d may be of a curved configuration as shown in FIG. 16 and, alternatively, the first and second gratings 7c and 7d may be of a configuration wherein the grating pitch Λ of each of the first and second gratings 7c and 7d varies progressively as shown in FIG. 17. Yet, although not shown in the accompanying drawings, the first and second gratings 7c and 7d may be of a configuration wherein each of the first and second gratings 7c and 7d is curved and has a progressively varying grating pitch Λ.

Figure 18:
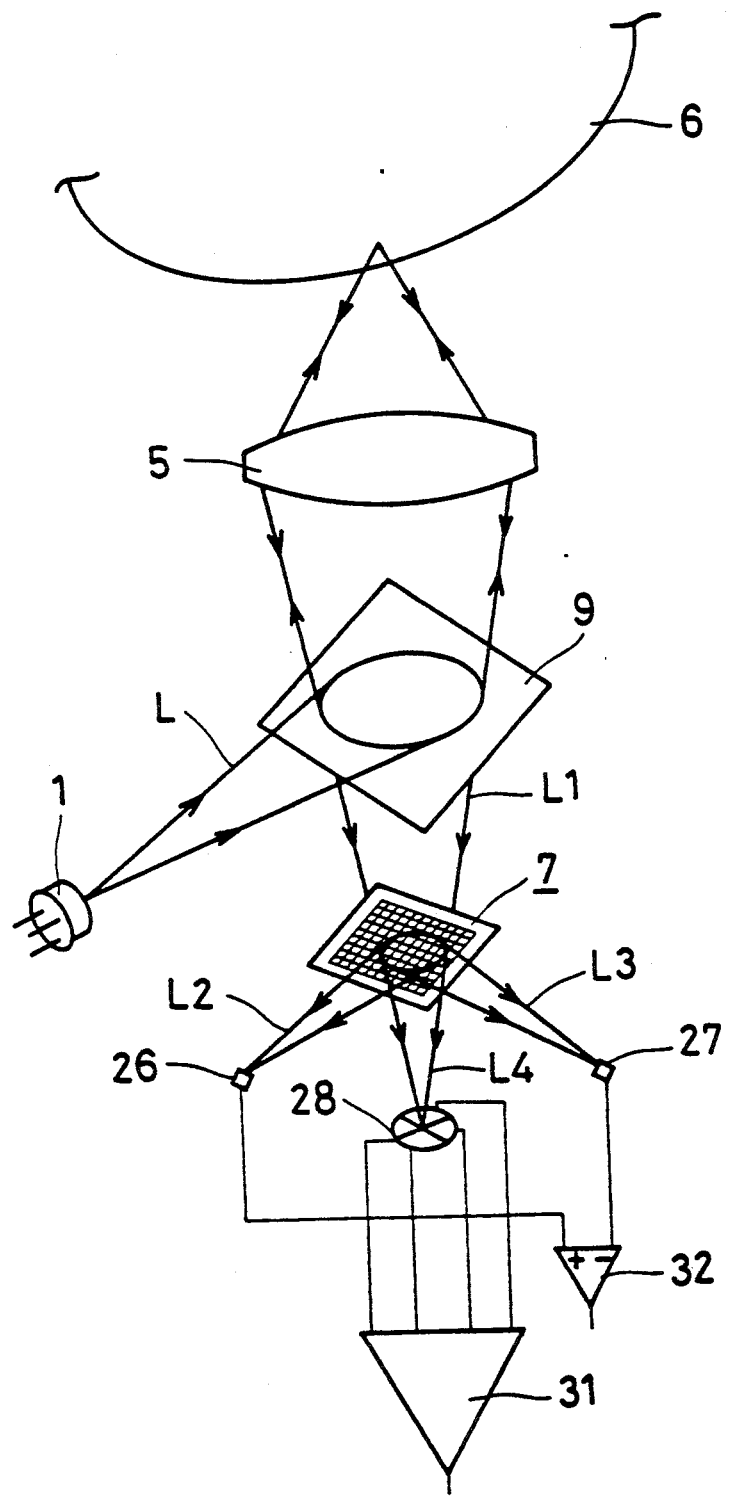
FIG. 18 is a schematic diagram showing a modification of the magneto-optical head system utilizing the polarizing optical element shown in FIG. 6.

A second preferred embodiment of the magneto-optical head system utilizing the transparent three-division element 7 is shown in FIG. 18. Referring now to FIG. 18, reference numeral 9 represents a plate-like half mirror disposed between the objective lens 5 and the transparent three-division element 7. In the embodiment of FIG. 18, the laser beam L emitted from the semiconductor laser source 1 is reflected by the half mirror 9 so as to travel towards the magneto-optical recording medium 6 through the objective lens 5. The laser beam L projected onto the magneto-optical recording medium 6 is subsequently reflected by the surface of the magneto-optical medium 6 so as to travel towards the half mirror 9 through the objective lens 5. The reflected laser beam entering the half mirror 9 passes therethrough and is then incident upon the three-division element 7. The reflected laser beam L1 entering the three-division element 7 is in part diffracted and in part transmitted in a manner as hereinbefore described with reference to the foregoing embodiment, particularly with reference to FIG. 7, thereby providing the transmitted and diffracted laser beams L2 and L3 and transmitted laser beam L4. As shown in FIG. 18, the transmitted and diffracted laser beams L2 and L3 are used for the reading of the information picked up from the magneto-optical recording medium 6, respectively, whereas the transmitted laser beam L4 is used for the detection of the tracking and focusing errors. Since the reflected laser beam incident upon the half mirror 9 is a converged light flux, a coma aberration would occur. However, this coma aberration can be advantageously compensated for by the three-division element 7.

Figure 19:
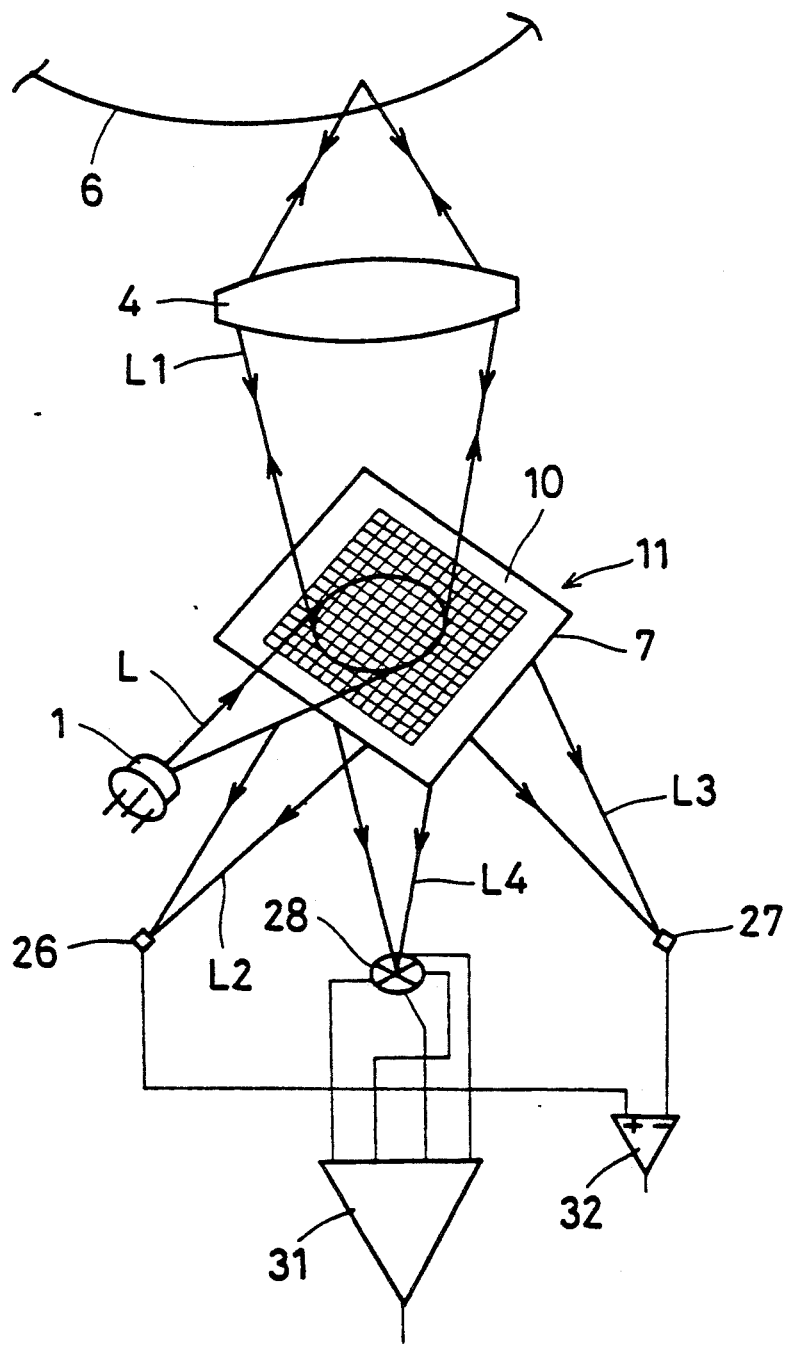
FIG. 19 is a schematic diagram showing the magneto-optical head system utilizing the polarizing optical element according to a second preferred embodiment of the present invention.

FIG. 19 illustrates the magneto-optical head system utilizing the three-division element 7 of a type integrated together with the semitransparent reflective layer (half mirror) 9 shown in and described with reference to FIG. 18. The assembly shown in FIG. 19 can be obtained by forming a semitransparent reflective layer 10 on a surface of the substrate 7a opposite to the surface thereof on which the first and second gratings 7c and 7d are formed. Even the embodiment shown in FIG. 19 can function in a manner similar to that shown in and described with reference to FIG. 18.

According to the embodiment shown in FIG. 19, the number of necessary component parts can be minimized as compared with the system shown in FIG. 18 and, therefore, the magneto-optical head system can be made compact.

It is to be noted that the other components of the system shown in each of FIGS. 18 and 19 which are not described in the description of the associated embodiment are identical with those shown in FIG. 9 and the details thereof are not reiterated for the sake of brevity.

It is to be noted that, in any one of the embodiments shown in FIGS. 9 and 18, the reflected laser beam L1, that is, the laser beam reflected from the magneto-optical recording medium 6, has been described as incident upon the three-division element 7 from the surface of the substrate 7a opposite to the gratings 7c and 7d. However, the reflected laser beam L1 may be incident upon the three-division element 7 from the surface where the gratings 7c and 7d are formed.

Figure 20:
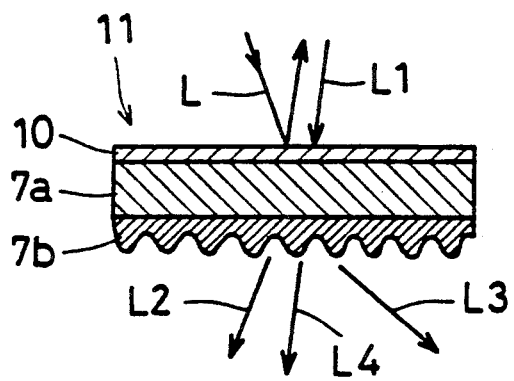
FIG. 20 is an exaggerated side sectional view of the polarizing optical element according to the second preferred embodiment of the present invention.
Figure 21:
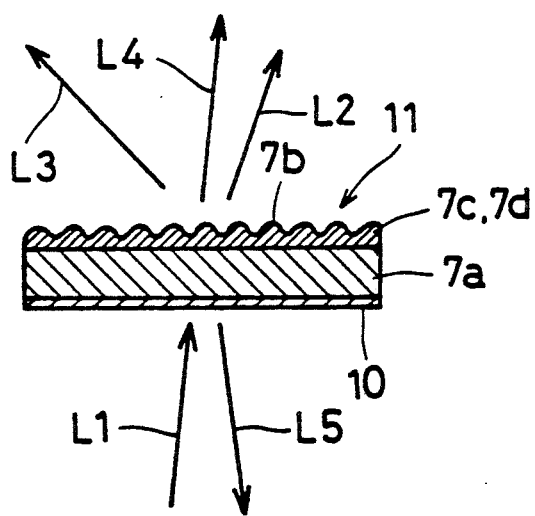
FIG. 21 is a schematic diagram showing the relationship between the incident laser beam and the exit laser beams applicable where the polarizing optical element according to the second preferred embodiment of the present invention is used as a transmitted four-division element.
Figure 22:
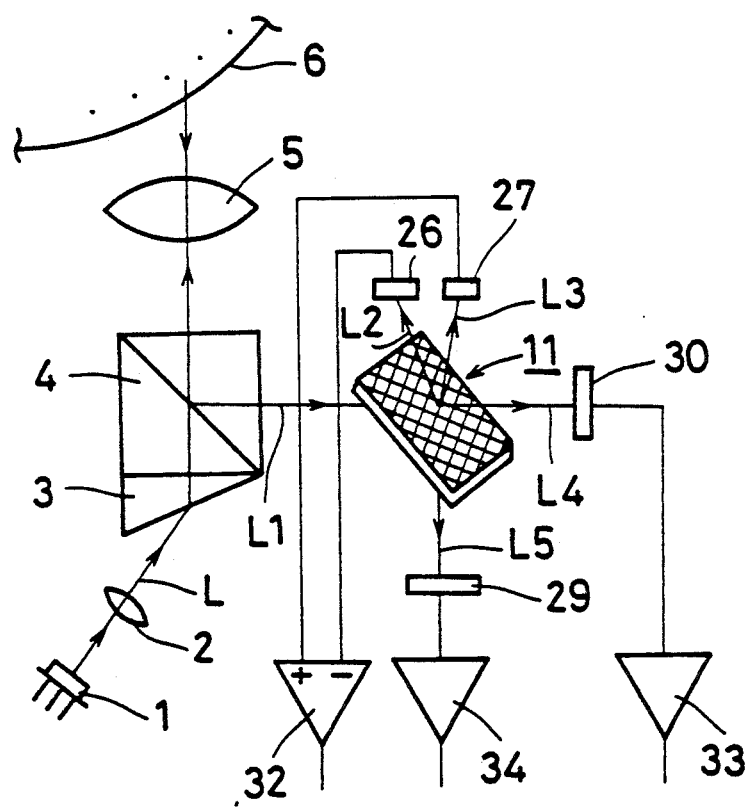
FIG. 22 is a schematic diagram showing the magneto-optical head system utilizing the polarizing element according to the second preferred embodiment of the present invention.

The construction wherein the three-division element 7 is integrated together with the half mirror 10 as shown in FIG. 20 can be used as a transparent four-division element 11 (polarizing optical element), as shown in FIG. 21, for dividing the incident laser beam L1 into the two transmitted and diffracted beams L2 and L3, the single transmitted beam L4 and a single reflected beam L5. FIG. 22 illustrates the magneto-optical head system wherein the four-division element 11 shown in FIG. 21 is employed.

Figure 23:
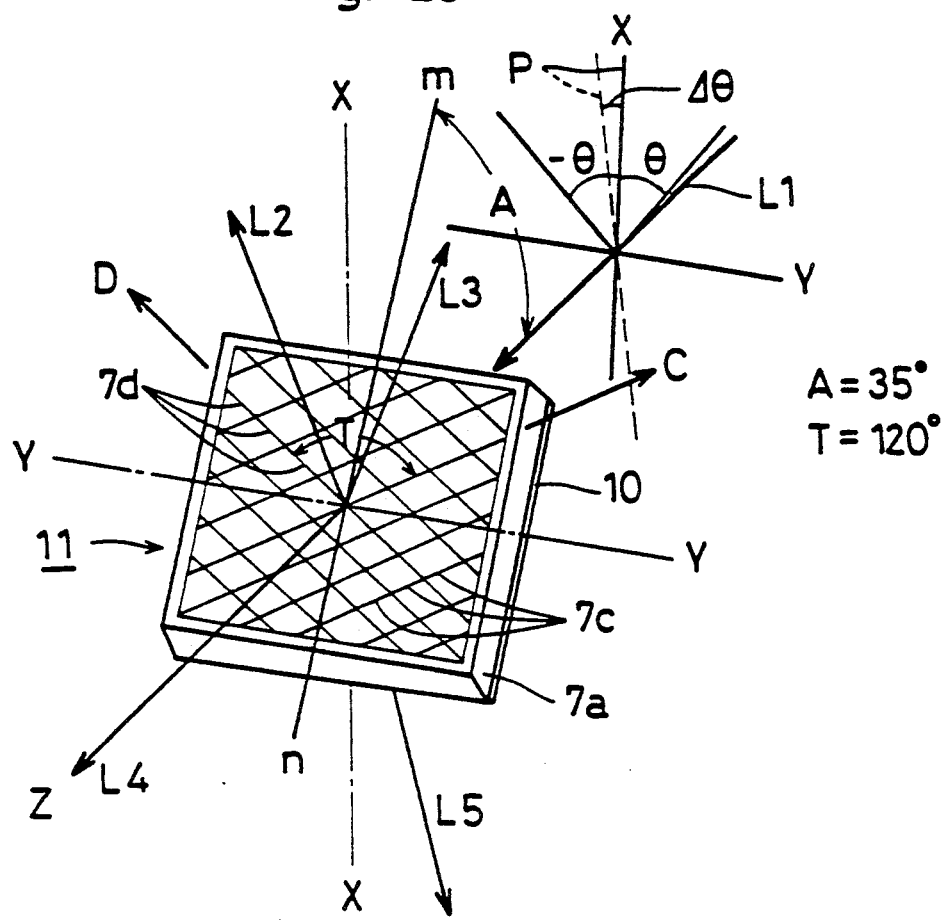
FIG. 23 is a schematic perspective view showing the angles of orientation of the polarizing optical element according to the second preferred embodiment of the present invention.

In the embodiment shown in FIGS. 21 and 22, each of the first and second gratings 7c and 7d are so designed and so constructed as to have the grating pitch Λ of 0.52 micrometer and the grating height hc or hd of 0.52 micrometer with the crossing angle T chosen to be 124°. The transparent four-division element 11 is so positioned as shown in FIG. 23 that the angle A formed between the center line (m-n line) of these two gratings 7c and 7d and the Z-axis can be 35°. Accordingly, where the direction of polarization of the incident laser beam L1 is parallel to the X-axis or parallel to the Y-axis, the respective intensities of the transmitted and diffracted beams L2 and L3 are equal to each other and, at the same time, since the transmitted beam L4 and the reflected beam L5 are produced, the incident beam L1 can be divided into four beam components. More specifically, 20% of the incident laser beam L1 is reflected by the semitransparent reflective layer 10 to provide the reflected beam L5; 30% of the beam component whose electric field vector is mainly diffracted by the grating 7d in a direction $+45°$ ($\theta = 45°$) from the X-axis is diffracted as the transmitted and diffracted beam L2; 30% of the beam component whose electric field vector is mainly diffracted by the grating 7c in a direction $-45°$ ($-\theta = 45°$) from the X-axis is diffracted as the transmitted and diffracted beam L3; and the remaining 20% are transmitted through the element 7 as the transmitted beam L4. In other words, the incident laser beam L1 incident upon the four-division element 7 is divided into the four beam components with the reflected laser beam L5, each of the transmitted and diffracted laser beams L2 and L3 and the transmitted laser beam L4 occupying 20%, 30% and 20%, respectively, of the incident laser beam L1.

The embodiment of FIGS. 21 and 22 operates in the following manner.

Where a portion of the magneto-optical disc 6 at which the incoming laser beam L has been reflected towards the beam splitter 4 is not magnetized, the reflected laser beam L1 enters the four-division element 11 with its polarizing plane P held parallel to the X-axis (or the Y-axis) as shown by the solid line in FIG. 23. In such case, since the directions of polarization of the first and second gratings 7c and 7d are identical with each other, no difference occur between respective outputs from the photo-detectors 26 and 27 in FIG. 22. On the other hand, where that portion of the magneto-optical disc 6 at which the incoming laser beam L has been reflected is magnetized, the polarizing plane P of the reflected laser beam is rotated a slight angle $\Delta\theta$ by Kerr effect as shown by the broken line in FIG. 23 and the reflected laser beam L1 enters the four-division element 11 with the polarizing plane P of the incident laser beam L1 inclined at an angle $\Delta\theta$ relative to the X-axis (or the Y-axis) without the intensity of the reflected beam L5 varying. Also, the directions of polarization with respect to the first and second gratings 7c and 7d are different from each other, the intensity of the transmitted and diffracted beam L3 increases and the intensity of the transmitted and diffracted beam L2 decreases.

Figure 24:
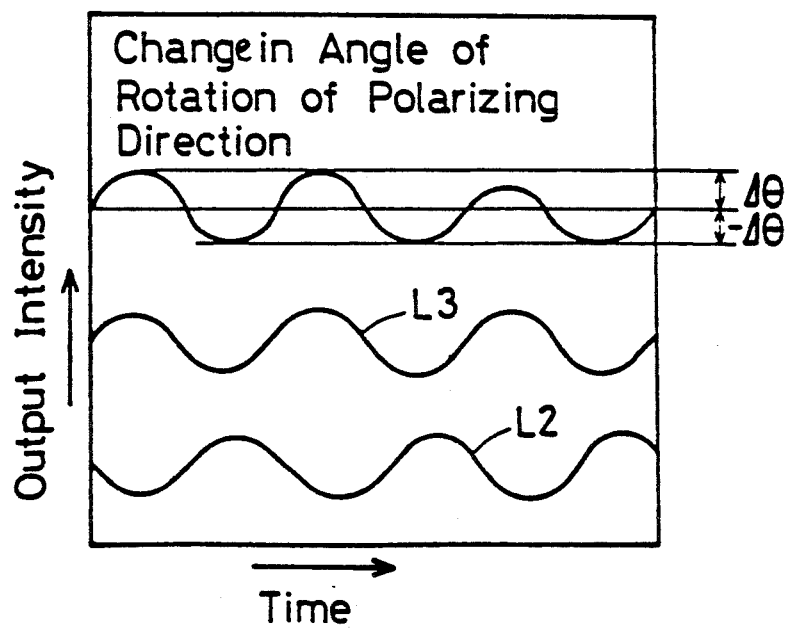
FIG. 24 is a graph showing characteristic curves illustrating change in respective intensities of the diffracted laser beams relative to the rotation of the polarizing plane in the second preferred embodiment of the present invention.

Accordingly, the respective outputs from the photo-detectors 26 and 27 in FIG. 22 vary in respective directions opposite to each other as shown in FIG. 24. Therefore, by detecting the difference between the respective outputs from the photo-detectors 26 and 27 in FIG. 22 with the use of the differential detector 32, the information picked up from the magneto-optical recording medium 6 can be read out.

Also, the tracking condition can be detected from the transmitted laser beam L4 by the photo-detector 30 and the tracking error detector 33 while the focusing condition can be detected from the reflected laser beam L5 by the photo-detector 29 and the focusing error detector 34. It is to be noted that the transmitted laser beam L4 and the reflected laser beam L5 may be used for the detection of the focusing error and the tracking error, respectively. It is also to be noted that each of the respective intensities of the transmitted laser beam L4 and the reflected beam L5 for use in detecting the focusing and tracking conditions remains constant regardless of the change occurring in the intensity of each of the transmitted and diffracted laser beams L2 and L3, a signal processing performed by the photo-detectors 33 and 34 can be advantageously stabilized.

Where the four-division element 11 having the semi-transparent reflective layer of reflectivity equal to or smaller than 50%, that is, the semitransparent reflective layer capable of reflecting 50% or a smaller amount of the incident beam, during the operation is utilized, any possible cross-talk between the focusing and tracking signals can be substantially eliminated in a manner similar to that in any one of the foregoing embodiments and the magneto-optical head system can be made compact.

The transparent four-division element 11 of the foregoing operating characteristic can be obtained by the use of a method substantially similar to that used for the manufacture of the polarizing optical element shown in and described with reference to FIG. 7. More specifically, the transparent four-division element 11 can be manufactured by forming, on the opposite surface of the transparent three-division element 7 shown in FIG. 7, a thin metal film of Ag or Pt or a multi-layered film of dielectric material with the use of any known coating method. Accordingly, this transparent four-division element 11 can be easier to make than the beam splitter and is therefore inexpensive.

Figure 26:
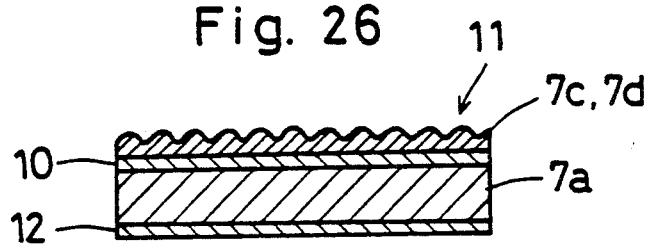
FIGS. 26 and 27 are schematic side sectional views showing respective modifications of the polarizing optical element according to the second preferred embodiment of the present invention.
Figure 27:
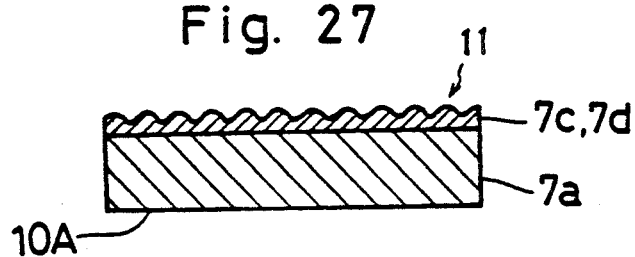
Figure 28:
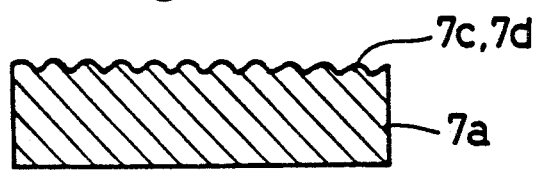
FIG. 28 is a schematic side view of the modified polarizing optical element which provides the basis for the polarizing optical element according to the second preferred embodiment of the present invention.

Other than the construction shown in FIG. 20, the transparent four-division element 11 may take a construction shown in any one of FIGS. 26, 27 and 28. In the construction shown in FIG. 26, the transparent four-division element 11 comprises the substrate 7a having one surface coated with the semitransparent reflective layer 10 on which the first and second gratings 7c and 7d each having a grating pitch equal to or shorter than the wavelength of the laser beam are formed in crossed fashion, said substrate 7a having the opposite surface coated with a non-reflective layer 12. In the construction shown in FIG. 27, the transparent four-division element 11 comprises the substrate 7a having one surface formed with the first and second gratings 7c and 7d in crossed fashion each having a grating pitch equal to or shorter than the wavelength of the laser beam, said substrate 7a having the opposite surface 10A made reflective so that the laser beam reflected from the reflective surface 10A can be used as the second reflected laser beam L5. The substrate 7a and the gratings 7c and 7d in the element 7 or 11 shown in any one of FIGS. 20, 26 and 27 can be in the form of the substrate 7a having one surface formed with the first and second gratings 7c and 7d as shown in FIG. 28.

Figure 29:
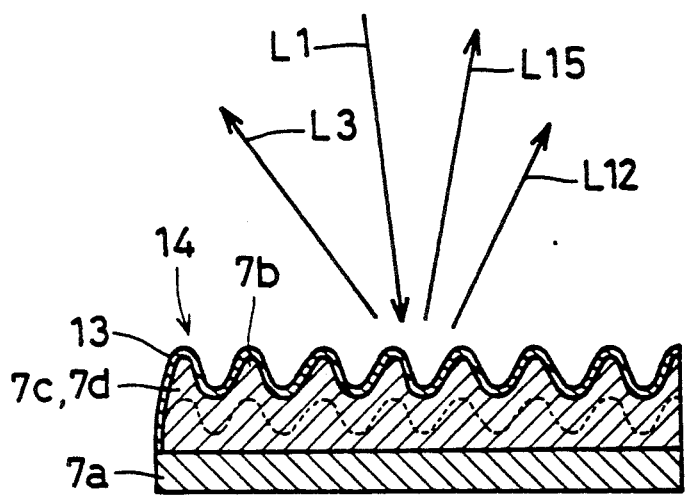
FIG. 29 is an exaggerated side sectional view of the polarizing optical element according to a third preferred embodiment of the present invention.

The present invention also pertains to the provision of a reflective three-division element (polarizing optical element), one example of which is shown in FIG. 29 in schematic side sectional representation. The reflective three-division element generally identified by 14 is similar to the transparent three-division element 7 of the construction shown in and described with reference to FIG. 6 wherein one surface of the substrate 7a is formed with the first and second gratings 7c and 7d in 120° crossed fashion (T=120°) each of said first and second gratings 7c and 7d having 0.5 micrometer in grating pitch Λ and 0.1 micrometer in grating height hc or hd, except that a reflective layer 13 of 100 angstroms in thickness is formed over the first and second gratings 7c and 7d as shown in FIG. 29.

Figure 30:
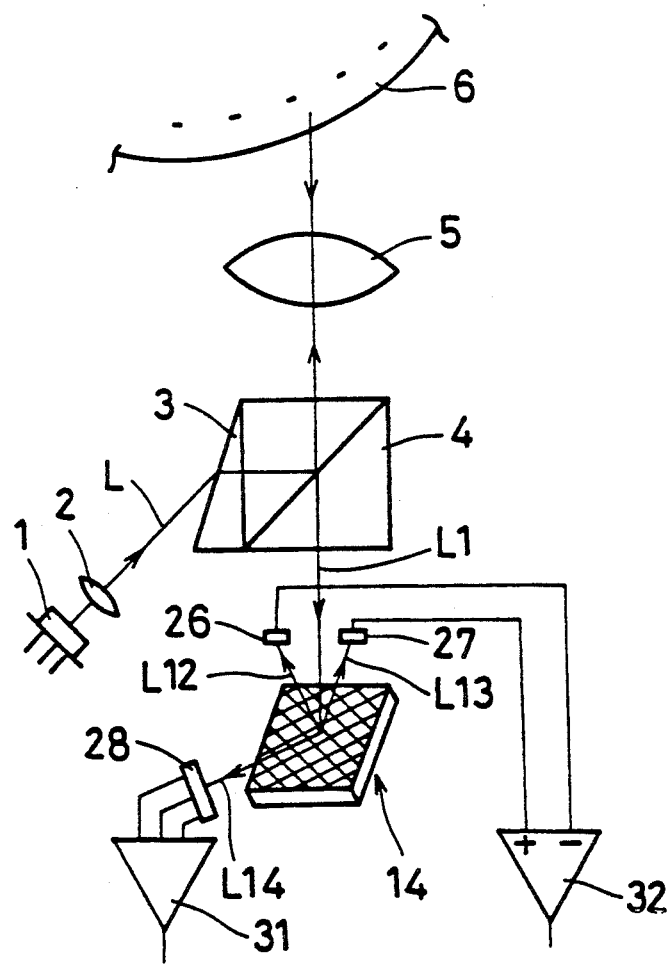
FIG. 30 is a schematic diagram showing the magneto-optical head system employing the polarizing optical element according to the third preferred embodiment of the present invention.
Figure 31:
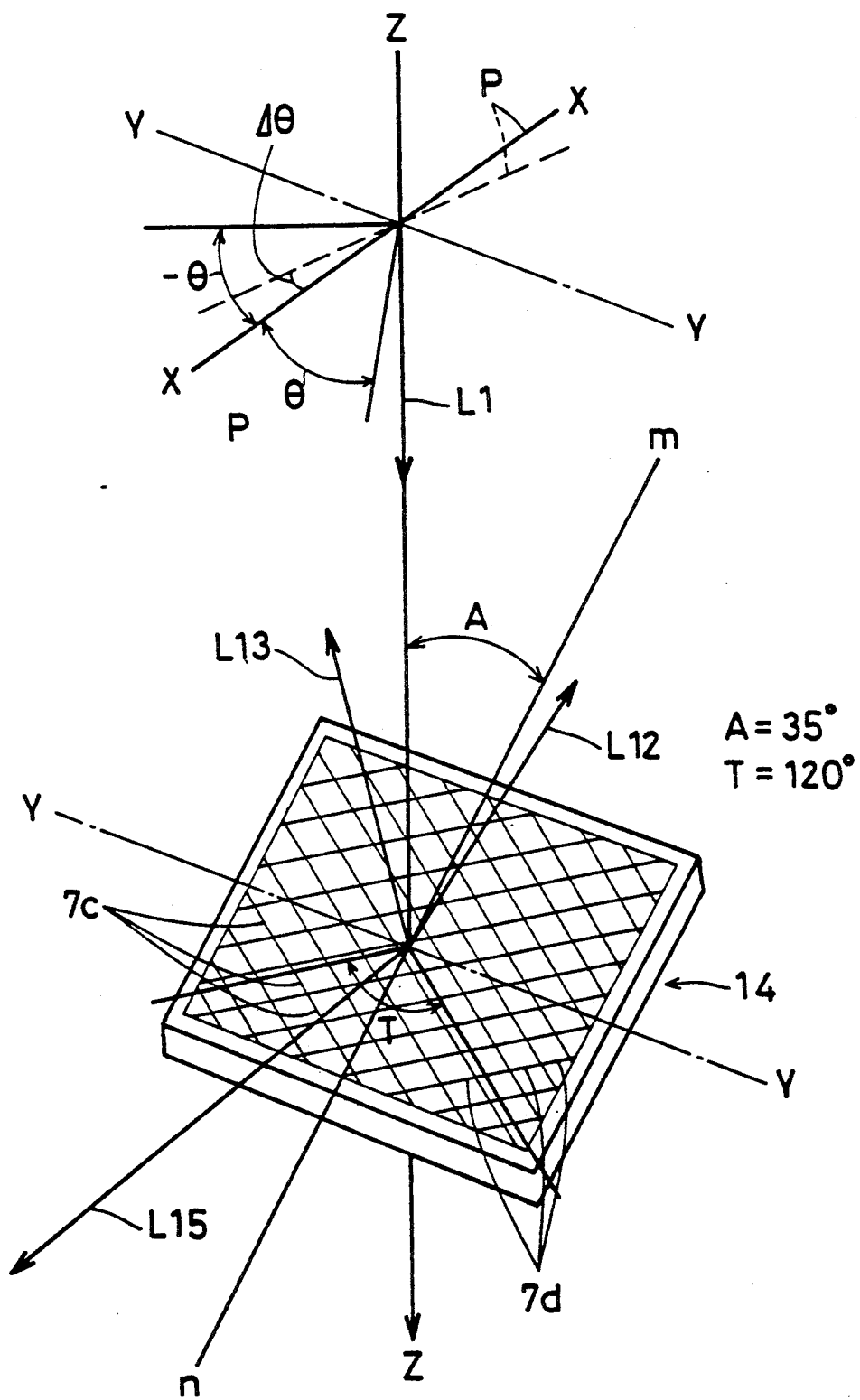
FIG. 31 is a schematic perspective view showing the angles of orientation of the polarizing optical element according to the third preferred embodiment of the present invention.

FIG. 30 illustrates the magneto-optical head system utilizing the reflective three-division element 14 shown in FIG. 29. As shown therein, the reflective three-division element 14 is disposed on one side of the beam splitter 4 opposite to the objective lens 5 with the first and second gratings 7c and 7d facing towards the beam splitter 4 and is so positioned that the angle A formed between the center line (m-n line) of the first and second gratings 7c and 7d and the Z-axis can be 35° as shown in FIG. 31. Accordingly, where the polarizing plane P of the incident laser beam L1 is parallel to the X-axis or Y-axis, the respective intensities of the reflected and diffracted laser beams L12 and L13 are equal to each other and, at the same time, the reflective three-division element 14 is effective to produce a reflected laser beam L15. Thus, the reflective three-division element 14 can divide the incident laser beam L1 into the two reflected and diffracted beams L12 and L13 and the reflected laser beam L15. More specifically, 35% of the beam component whose electric field vector is mainly diffracted by the grating 7c in a direction −45° ($\theta = -45°$) from the X-axis is diffracted as the reflected and diffracted beam L12; 35% of the beam component whose electric field vector is mainly diffracted by the grating 7d in a direction 45° ($\theta = 45°$) from the X-axis is diffracted as the reflected and diffracted beam L13; and the remaining 30% are reflected by the element 14 as the reflected beam L15. In other words, the incident laser beam L1 incident upon the reflective three-division element 14 is divided into the three beam components with each of the reflected and diffracted laser beams L12 and L13 and the reflected laser beam L15 occupying 35% and 30%, respectively, of the incident laser beam L1.

Figure 32:
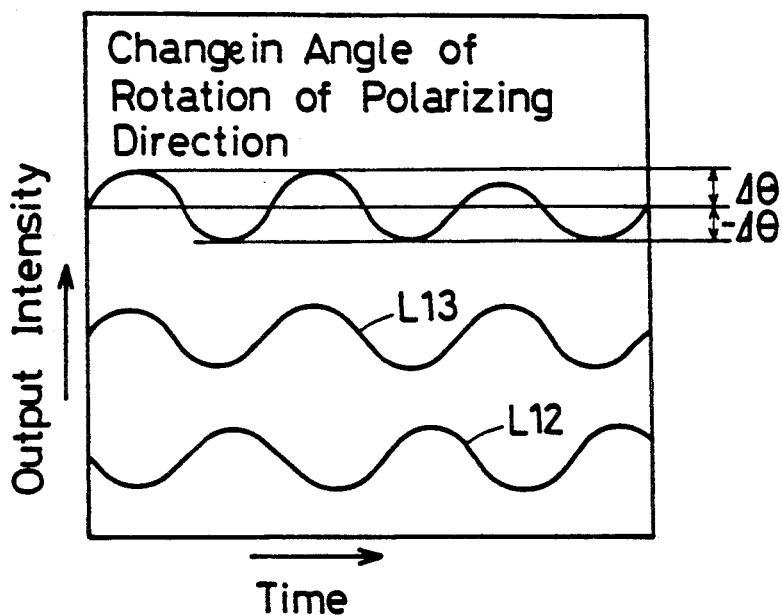
FIG. 32 is a graph showing characteristic curves illustrating change in respective intensities of the diffracted laser beams in the third preferred embodiment of the present invention.

The operation of the embodiment shown in and described with reference to FIGS. 29 to 31 will now be described.

Where a portion of the magneto-optical recording medium 6 at which the incoming laser beam L has been reflected towards the beam splitter 4 is not magnetized, the reflected laser beam L1 enters the reflective three-division element 14 with its polarizing plane P held parallel to the X-axis (or Y-axis) as shown by the solid line in FIG. 31. In such case, since the respective directions of polarization with respect to the first and second gratings 7c and 7d are identical with each other, no difference occur between the respective outputs from the photo-detectors 26 and 27 in FIG. 30. On the other hand, where that portion of the magneto-optical recording medium 6 at which the incoming laser beam L has been reflected is magnetized, the polarizing plane P of the reflected laser beam is rotated a slight angle $\Delta\theta$ by Kerr effect as shown by the broken line in FIG. 31 and the reflected laser beam L1 enters the reflective three-division element 14 with the direction of polarization of the reflected laser beam L1 inclined an angle $\Delta\theta$ relative to the X-axis (or Y-axis). In such case, since the respective directions of polarization with respect to the first and second gratings 7c and 7d differ from each other, the intensity of the reflected and diffracted laser beam L13 increases while the intensity of the reflected and diffracted laser beam L12 decreases. Accordingly, the respective outputs from the photo-detectors 26 and 27 vary in respective directions opposite to each other as shown in FIG. 32. Therefore, by detecting the difference between the respective outputs from the photo-detectors 26 and 27 of FIG. 30 with the use of the differential detector 32, the information picked up from the magneto-optical recording medium 6 can be read out.

On the other hand, the reflected laser beam L15 is detected by the four-division photo-detector assembly 28 so that the tracking and focusing conditions can be subsequently detected by the tracking and focusing error detector 31.

As hereinabove described, according to the embodiment shown in and described with reference to FIGS. 29 to 31, the reflective three-division element 14 serves the function of the conventionally used two beam splitters, thereby contributing to the minimization of the number of the required component parts. Also, since the reflective three-division element 14 may have the grating heights (0.1 micrometer) smaller than those (0.6 micrometer) used in the transparent three-division element 7 shown in and described with reference to FIG. 6, the manufacture of the reflective three-division element 14 is relatively easy.

The reflective three-division element 14 of the foregoing operating characteristic can be manufactured in a manner similar to the manufacture of the transparent three-division element 7 shown in and described with reference to FIG. 7, except for an additional manufacturing step required to form the reflective layer 13 made of a metallic layer of aluminum or silver, or a multi-coated dielectric film made of, for example, $SiO_2$ or $TiO_2$, or a mixture thereof.

Figure 33:
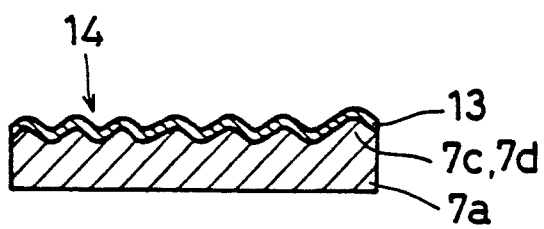
FIGS. 33 and 34 are schematic side sectional views showing respective modifications of the polarizing optical element according to the third preferred embodiment of the present invention.
Figure 34:
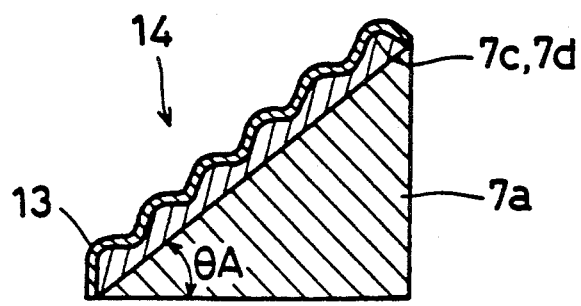

Other than the construction shown in FIG. 29, the reflective three-division element 14 may take such a construction as shown in any one of FIGS. 33 and 34. In particular, in the construction shown in FIG. 33, the reflective three-division element 14 comprises the substrate 7a on which the diffraction gratings 7c and 7d are directly formed and subsequently covered by the reflective film 13. Depending on the requirements for the magneto-optical head system to meet, the reflective three-division element 14 may be made into a generally prism-like shape having an apex angle indicated by $\theta A$, other than the plate-like shape, such as shown in FIG. 34.

Figure 35:
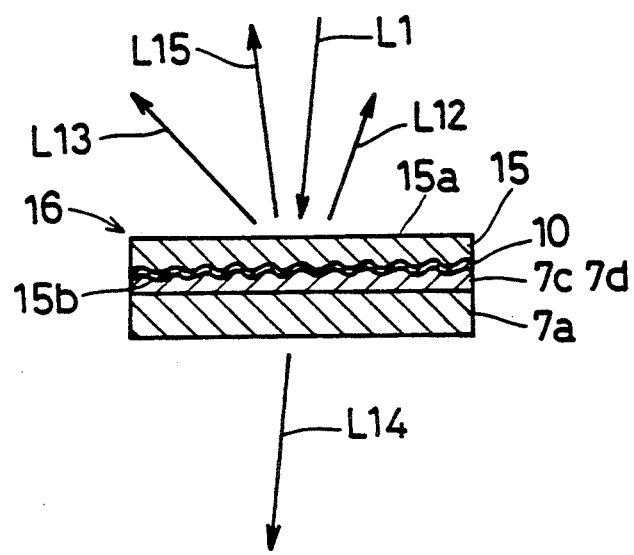
FIG. 35 is a schematic side sectional view of the polarizing optical element according to a fourth preferred embodiment of the present invention.

FIG. 35 illustrates a reflective four-division element 16 (polarizing optical element) in schematic side sectional representation. The reflective four-division element 16 comprises a first substrate 7a having first and second gratings 7c and 7d formed on one surface of the first substrate 7a so as to cross relative to each other at a crossing angle T of 120°, each of said first and second gratings 7c and 7d made of the material having a first predetermined refractive index N1 and having a grating pitch $\Lambda$ of 0.5 micrometer and grating heights of 0.5 micrometer, and a semitransparent reflective layer 10 overlaying the first and second gratings 7c and 7d and having a light transmissivity of 20%. The light transmissivity of the semitransparent reflective layer 10 may preferably be within the range of 1 to 50%.

The reflective four-division element 16 in the embodiment shown in FIG. 35 also comprises a second substrate 15 of a second predetermined refractive index N2 having a smooth surface 15a and overlaying the semitransparent reflective layer 10 on the first substrate 7a with an indented surface 15b of the second substrate 15 held in contact with the semitransparent reflective layer 10, thereby forming no void or intersteces between the second substrate 15 and the layer 10, and capable of passing 20% of the reflected laser beam L1 and reflecting the remaining portion of the reflected laser beam L1. The first and second gratings 7c and 7d and the second substrate 15 are so chosen that the first and second predetermined refractive indexes N1 and N2 are preferably equal to each other, namely, the gratings 7c and 7d and the second substrate 15 are made of the same material, or the refractive indexes N1 and N2 may give a difference of 0.03 or smaller therebetween whereby rays of light passing through the polarizing optical element 16, that is, the reflective four-division element, will not be diffracted by the gratings 7c and 7d.

Figure 36:
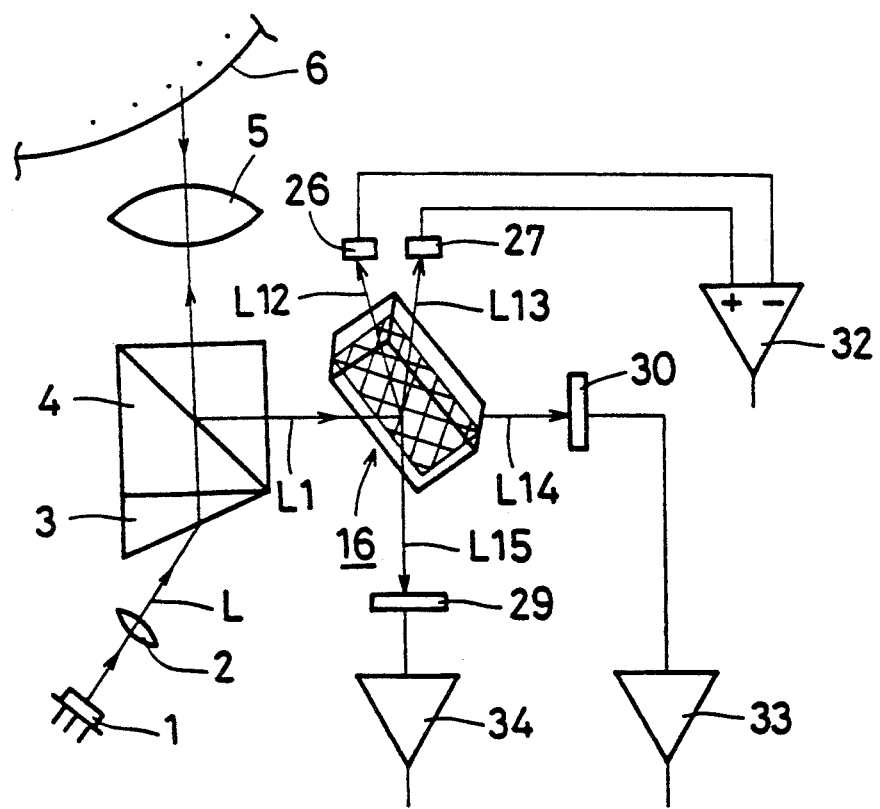
FIG. 36 is a schematic diagram showing the magneto-optical head system employing the polarizing optical element according to the fourth preferred embodiment of the present invention.

The magneto-optical head system utilizing the reflective four-division element 16 of the above described construction is illustrated in FIG. 36. As shown therein, the reflective four-division element 16 is disposed between the beam splitter 4 and the photo-detector assembly 30 with the smooth surface 15a thereof facing towards the beam splitter 4.

Figure 37:
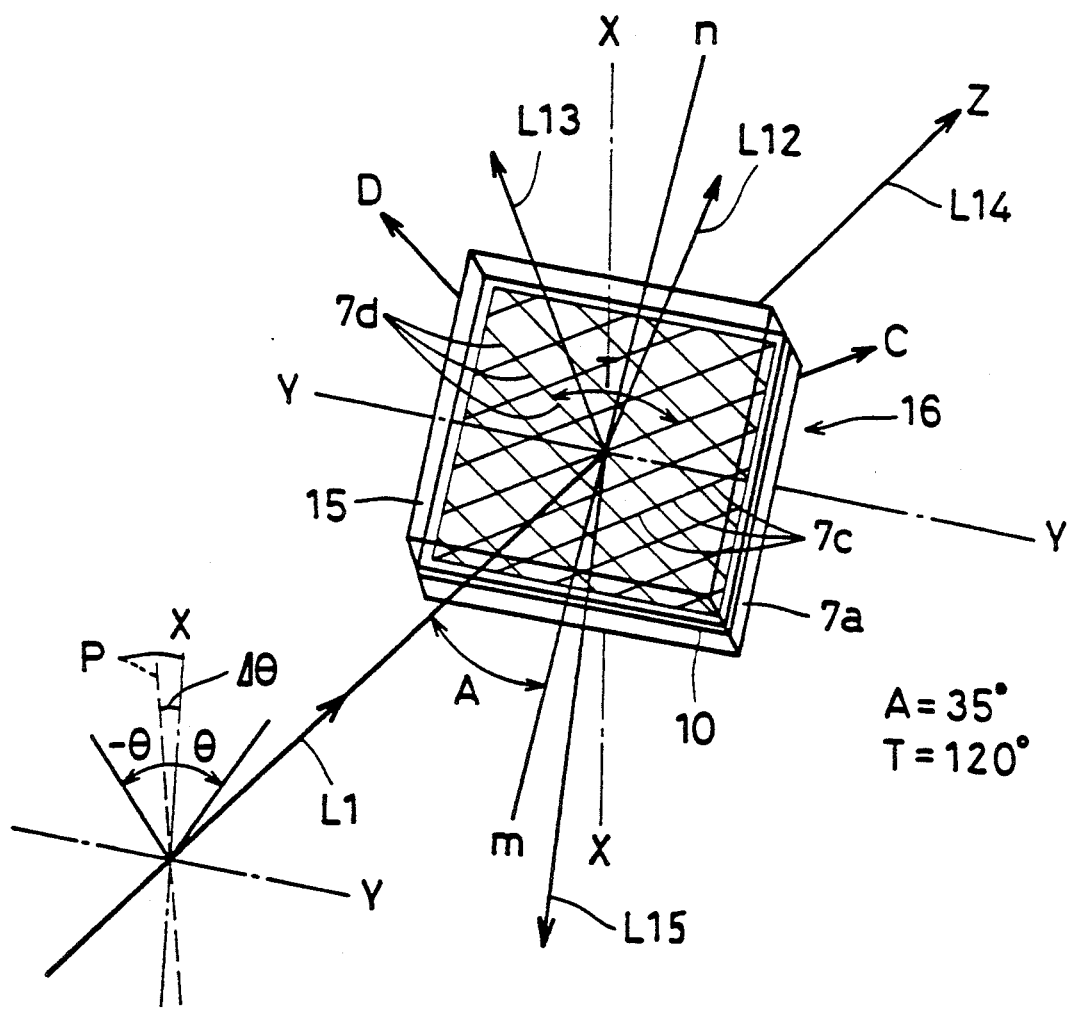
FIG. 37 is a schematic perspective view showing the angles of orientation of the polarizing optical element according to the fourth preferred embodiment of the present invention.

The angle of orientation of the reflective four-division element 14 is shown in FIG. 37. As shown therein, the angle A formed between the center line (m-n) line, dividing the crossing angle T between the first and second gratings 7c and 7d into two equal parts, and the Z-axis is selected to be 35°. Accordingly, where the polarizing plane P of the incident laser beam L1 is parallel to the X-axis or Y-axis, the respective intensities of the reflected and diffracted laser beams L12 and L13 are equal to each other and, at the same time, the reflective four-division element 16 produces the reflected laser beam L15 and the transmitted laser beam L14. In this way, the reflective four-division element 16 according to the embodiment shown in FIGS. 35 is effective to divide the laser beam L1 incident thereupon into the four beam components including the reflected and diffracted laser beams L12 and L13, the reflected laser beam L15 and the transmitted laser beam L14. More specifically, 20% of the incident laser beam L1 is transmitted through the four-division element 16 by the action of the semitransparent reflective layer 10 as the transmitted beam L14; 30% of the beam component whose electric field vector is mainly diffracted by the grating 7c in a direction $+45°$ ($\theta=45°$) from the X-axis is diffracted as the reflected and diffracted beam L12; 30% of the beam component whose electric field vector is mainly diffracted by the grating 7d in a direction $-45°$ ($-\theta=45°$) from the X-axis is diffracted as the reflected and diffracted beam L13; and the remaining 20% are reflected as the reflected beam L15. In other words, the incident laser beam L1 incident upon the reflective four-division element 16 is divided into the four beam components with the transmitted laser beam L14, each of the reflected and diffracted laser beams L12 and L13 and the reflected laser beam L15 occupying 20%, 30% and 20%, respectively, of the incident laser beam L1.

The magneto-optical head system shown in FIG. 36 and utilizing the reflective four-division element 16 of the construction shown in FIG. 35 operates in the following manner.

The manner in which information recorded on the magneto-optical recording medium 6 is read out from the reflected and diffracted laser beams L12 and L13 by the photo-detectors 26 and 27 in cooperation of the differential detector 32 is substantially identical with that accomplished by the embodiment shown in FIG. 30.

On the other hand, the detection of the tracking and focusing conditions from the transmitted laser beam L14 and the reflected laser beam L15 by a series-connected circuit of photo-detector 30 and tracking error detector 33 and a series-connected circuit of photo-detector 29 and focusing error detector 34, respectively, is substantially identical with the similar detection of the tracking and focusing conditions from the transmitted laser beam L4 and the reflected laser beam L5 produced by the transparent four-division element 11 shown in and described with reference to FIG. 22. In other words, the reflective four-division element 16 according to the embodiment shown in and described with reference to FIG. 35 operates in a manner substantially similar to, and can give effects similar to those exhibited by, the transparent four-division element 11 according to the embodiment of FIG. 22.

The reflective four-division element 16 of the construction shown in and described with reference to FIG. 35 can be manufactured in a manner substantially similar to the manufacture of the polarizing optical element, that is, the transparent three-division element 7 shown in and described with reference to FIG. 6. More specifically, after the manufacture of a polarizing optical element similar in structure to the transparent three-division element 7 shown in FIG. 6, a thin metal film of Ag or Pt or a multi-coated thin film of dielectric material is deposited on the first and second gratings 7c and 7d by the use of any known deposition technique, for example, by the use of a vapor-deposition method, thereby to form the semitransparent reflective layer 10 having a predetermined light transmissivity and a predetermined reflectivity, followed by the formation of the second substrate 15 having the smooth surface 15a by the use of any known method, for example, by the use of a spin coating method or a vacuum deposition method to complete the reflective four-division element 16. During the formation of the second substrate 15 overlaying the thin metal film or multi-coated thin layer, care must be taken so as to avoid any voids or interstices between the second substrate 15 and the indentations in the thin metal film or multi-coated thin layer that are following the complemental indentations in the first and second gratings 7c and 7d.

Figure 38:
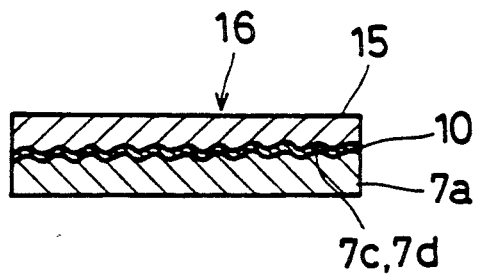
FIGS. 38 and 39 are schematic side sectional views showing respective modifications of the polarizing optical element according to the fourth preferred embodiment of the present invention.
Figure 39:
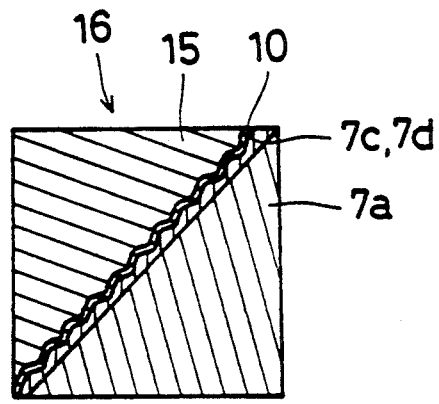

It is to be noted that the first substrate 7a of the reflective four-division element 16 may be integrally formed with and made of the same material as the first and second gratings 7c and 7d as shown in FIG. 38. Also, the first and second substrates 7a and 15 may be so shaped as to represent a generally prism-like shape as shown in FIG. 39.

From the foregoing description of the present invention in connection with the various preferred embodiments thereof, it has now become clear that, since the polarizing optical element is provided with the first and second gratings crossing at the predetermined crossing angle T and each having the predetermined grating pitch equal to or smaller than the wavelength of the laser beam used in association therewith, the single polarizing optical element is effective to produce the two diffracted laser beams and the single transmitted or reflected laser beams.

In another aspect of the present invention in which the semitransparent reflective layer is formed in the polarizing optical element, the polarizing optical element as a whole is effective to produce the two diffracted laser beams, the single transmitted laser beam and the single reflected laser beam.

Accordingly, the polarizing optical element according to the present invention can play a role hitherto performed by the use of the two beam splitters and is therefore compact and is inexpensive.

Also, in the practice of the present invention, the projection angle $2\alpha$ is selected to be within the range of 70° to 110°, a change in difference between the respective intensities of the two diffracted laser beams can take place over a relatively wide range of change of the polarizing plane of the incoming laser beam, and is relatively considerable. Therefore, the rotation of the polarizing plane can be easily detected. Particularly where the projection angle is selected to be within the more preferable range of 84° to 96°, the detection of the rotation of the polarizing plane can be facilitated and, since the change in intensity of the transmitted laser beam, a change in intensity of the laser beam emitted from the laser beam source can also be detected.

Again, since the projection angle $2\alpha$ is relatively small, the angle formed between the two diffracted laser beams can be narrowed and, therefore, the device utilizing the polarizing optical element according to the present invention can be made compact.

According to another aspect of the present invention, since the polarization analyzing device is constructed with the use of the unique polarizing optical element which is effective to produce a combination of the single transmitted or reflected laser beam and the two diffracted laser beam, or a combination of the single reflected laser beam, the single transmitted laser beam and the two diffracted laser beam, the number of component parts necessitated in the polarization analyzing device can be advantageously minimized and therefore the device itself can be manufactured compact and inexpensive.

Furthermore, according to the present invention, since the polarizing plane of the incoming laser beam which subsequently enters the polarizing optical element is so designed as to lie within ±5° relative to the X-axis or the Y-axis rotated 90° from the X-axis, the respective intensities of the two diffracted laser beams can change considerably thereby facilitating the detection of the polarizing plane of the incoming laser beam.

Yet, the detection of any one of the focusing and tracking errors can be carried out without being accompanied by the cross-talk between the detection signals associated respectively with the focusing and tracking error detections, making it possible to manufacture the magneto-optical head system in compact size and at reduced cost.

The use of the semitransparent reflective layer on the surface of the substrate opposite to the surface where the gratings are formed is effective to permit the polarizing optical element to compensate for any possible coma aberration and, therefore, the polarization analyzing device can be manufactured compact with a minimized number of component parts.

Although the present invention has fully been described in connection with the preferred embodiments thereof with reference to the accompanying drawings used only for the purpose of illustration, those skilled in the art will readily conceive numerous changes and modifications within the framework of obviousness upon the reading of the specification herein presented of the present invention. By way of example, although in any one of the foregoing embodiments of the present invention it has been shown and described that the crossing angle T between the first and second gratings 7c and 7d and the angle A between the grating surface and the path of travel of light represented by Z-axis are selected to be 120° and 35°, respectively, they may not be always limited thereto, but may be suitably selected depending on the grating pitch Λ of each of the first and second gratings 7c and 7d and the wavelength of the laser beam used. More specifically, in the practice of the present invention, the crossing angle T may be of a value within the range of 0° to 180° and the angle A may be of a value within the range of 0° to 90° so that the transmitted and diffracted laser beams L2 and L3, or the reflected and diffracted laser beams L12 and L13, can be produced.

Also, in anyone of the foregoing embodiments, the polarizing plane P of the incident laser beam L1 has been shown and described as being parallel to the X-axis (or Y-axis). However, in the practice of the present invention, where the diffraction efficiency of one of the first and second gratings 7c and 7d is different from that of the other of the first and second gratings 7c and 7d or where the m-n line does not lie on the center line between the first and second gratings 7c and 7d, the polarizing plane P of the incident laser beam L1 may be chosen as lying between the X-axis and the Y-axis.

Figure 25:
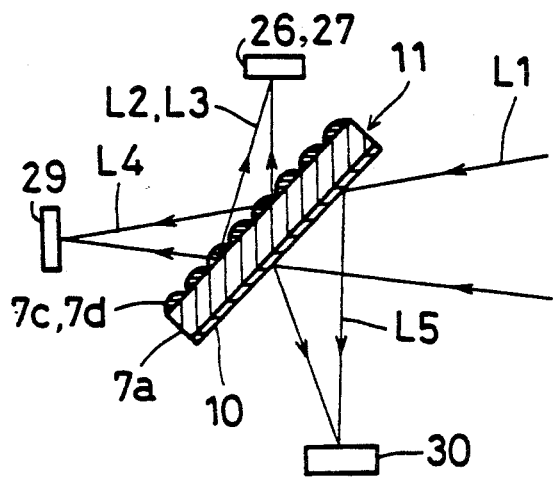
FIG. 25 is a schematic diagram showing a different arrangement of various photo-detectors relative to the polarizing optical element according to the second preferred embodiment of the present invention.
Figure 40:
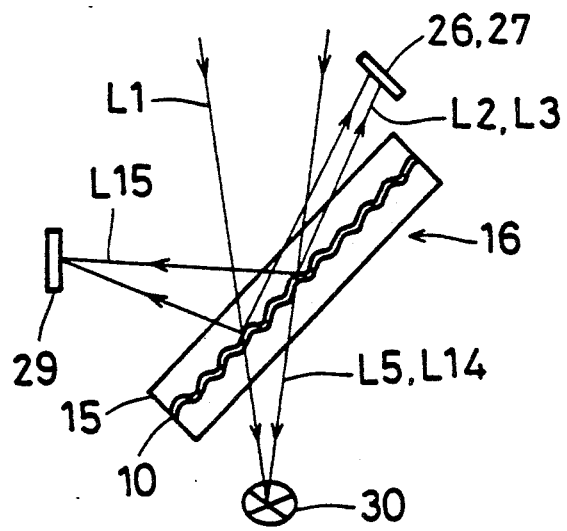
FIG. 40 is a schematic diagram showing a different arrangement of the photo-detectors relative to the polarizing optical element according to the fourth preferred embodiment of the present invention.

In addition, although in describing any one of the foregoing embodiments of the present invention the details of the focusing and tracking error detections have not been set forth, any techniques hitherto used in the commercially available devices can be employed. For example, as shown in any one of FIGS. 25 and 40, the focusing condition may be detected by causing the reflected laser beam L1 with the use of a lens (not shown) so as to impinge upon the four-division element 11 or 16 and then causing the four-division element 11 or 16 to produce the transmitted laser beam L4 or L14 with which the focusing error can be detected according to an astigmatism detection method, and also the reflected laser beam L5 or L15 with which the tracking error can be detected according to a push-pull method. Other than those methods, a tracking error detection method utilizing three beams, a focusing error detection method according to the astigmatism detection method or by the use of Foucault method, or any other well-known method can be employed in the practice of the present invention.

Yet, although in any one of the foregoing embodiments one beam has been shown and described as employed for the detection of each of the tracking and focusing errors, a three-beam method may be employed in which case a grating (phase grating) may be provided between the semiconductor laser source 1 and the collimator lens 2 in, for example, the embodiment of FIG. 9 for the tracking error detection and in which the focusing error detection is carried out by the use of the four-division photo-detector assembly 28. Also, a λ/2 plate may be disposed at any arbitrary position so that the polarizing direction of light can be varied.

Furthermore, in any one of the foregoing embodiments, the laser beam impinging upon the magnetooptical recording medium 6 has been shown and described as reflected from such magneto-optical recording medium 6. The present invention can, however, be equally applicable to the processing of the laser beam which has been passed through the magneto-optical recording medium. In other words, the polarizing optical element and the device utilizing the same can be equally applicable to the configuration wherein Faraday effect is utilized.

Accordingly, such changes and modifications are, unless they depart from the spirit and scope of the present invention as delivered from the claims annexed hereto, to be construed as included therein.

What is claimed is:

1. A polarizing optical element which comprises a first substrate having a first surface whose contour is modulated, thereby forming only first and second relief gratings so as to cross relative to each other at a predetermined crossing angle, each of said first and second gratings having a grating pitch equal to or smaller than the wavelength of a laser beam which may be incident upon the polarizing optical element, wherein the diffraction efficiency of said gratings is dependent upon the polarization of said laser beam, thereby producing a transmitted or reflected beam and two diffracted laser beams responsive to the incident laser beam, said two diffracted laser beams having polarizations which are different from the incident laser beam.

2. The polarizing optical element as claimed in claim 1, further comprising a generally plate-like semitransparent reflective layer.

3. The polarizing optical element as claimed in claim 2, wherein the semitransparent reflective layer has a reflectivity of 50% or lower relative to the amount of the incoming laser beam.

4. The polarizing optical element as claimed in claim 2, wherein said semitransparent reflective layer deposited on a second surface of the substrate opposite to said first surface where the first and second gratings are formed.

5. The polarizing optical element as claimed in claim 2, wherein said semitransparent reflective layer deposited over the first surface of the substrate, said first and second gratings being formed over the semitransparent reflective layer, said substrate having a second surface opposite to the first surface and having a non-reflective layer deposited thereon.

6. The polarizing optical element as claimed in claim 1, further comprising a semitransparent reflective layer overlaying the first and second gratings and a second substrate having a smooth surface and an indented surface opposite to each other, said second substrate being laminated over the semitransparent reflective layer with the indented surface held in contact therewith, said indented surface of the second substrate being in complemental relationship in shape to the first and second gratings.

7. The polarizing optical element as claimed in claim 6, wherein the semitransparent reflective layer has a light transmissivity within the range of 1 to 50% relative to the incident laser beam.

8. The polarizing optical element as claimed in claim 6, wherein material forming the first and second gratings and second substrate have respective refractive indexes which give a difference of 0.03 or smaller therebetween.

9. The polarizing optical element as claimed in claim 8, wherein material forming the first and second gratings and second substrate are made of the same material.

10. The polarizing optical element as claimed in claim 1, further comprising a light reflective layer formed over the first and second gratings.

11. The polarizing optical element as claimed in claim 1, wherein an angle formed by the projection of a K vector angle formed between first and second K vectors on the first surface, said first and second K vectors each being in a direction perpendicular to lines connecting the tops of rows of projections forming the first and second gratings, respectively, onto a plane which is perpendicular to the path of travel of the incident laser beam is selected to be within the range of 70° to 110°.

12. The polarizing optical element as claimed in claim 1, wherein the angle formed by the projection of a K vector angle formed between first and second K vectors on the first surface, said first and second K vectors each being in a direction perpendicular to lines connecting the tops of rows of projections forming the first and second gratings, respectively, onto a plane which is perpendicular to the path of travel of the incident laser beam, is selected to be within the range of 84° to 96°.

13. The polarizing optical element as claimed in claim 1, wherein the angle formed by projection of a K vector angle formed between first and second K vectors on the first surface, said first and second K vectors each being in a direction perpendicular to lines connecting the tops of rows of projections forming the first and second gratings, respectively, onto a plane which is perpendicular to the path of travel of the incident laser beam, is selected to be within the range of 10° to 20°.

* * * * *